US006665136B2

(12) United States Patent
Clinton et al.

(10) Patent No.: US 6,665,136 B2
(45) Date of Patent: Dec. 16, 2003

(54) RECORDING HEADS USING MAGNETIC FIELDS GENERATED LOCALLY FROM HIGH CURRENT DENSITIES IN A THIN FILM WIRE

(75) Inventors: Thomas William Clinton, Pittsburgh, PA (US); Michael Allen Seigler, Pittsburgh, PA (US); Robert Earl Rottmayer, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 49 days.

(21) Appl. No.: 10/084,033

(22) Filed: Feb. 27, 2002

(65) Prior Publication Data

US 2003/0043490 A1 Mar. 6, 2003

Related U.S. Application Data

(60) Provisional application No. 60/315,467, filed on Aug. 28, 2001.

(51) Int. Cl.[7] ............................. G11B 5/02; G11B 5/09
(52) U.S. Cl. ......................................... 360/55; 360/126
(58) Field of Search ................. 360/55, 126; 369/13.17

(56) References Cited

U.S. PATENT DOCUMENTS

| 2,680,156 A | 6/1954 | Thorensen |
| 2,862,066 A | 11/1958 | Thiele |
| 2,927,973 A | 3/1960 | Geller |
| 3,475,739 A | 10/1969 | Manna |
| 3,889,295 A | 6/1975 | Billawala |
| 4,001,890 A | 1/1977 | Kayser |
| 4,191,982 A | 3/1980 | Wood et al. |
| 4,405,960 A | 9/1983 | Pick et al. |
| 4,631,612 A | 12/1986 | Shiiki et al. |
| 4,763,215 A | 8/1988 | Gueugnon et al. |

(List continued on next page.)

FOREIGN PATENT DOCUMENTS

GB        882779       11/1961

OTHER PUBLICATIONS

*IBM Technical Disclosure Bulletin*, vol. 24, No. 8, Jan. 1982, p. 4034.

*Patent Abstracts of Japan*, vol. 006, No. 206 (P–149), Oct. 19, 1982 & JP 57 113406 A (Ricoh KK), Jul. 14, 1982 abstract.

(List continued on next page.)

*Primary Examiner*—David Hudspeth
*Assistant Examiner*—Dan I. Davidson
(74) *Attorney, Agent, or Firm*—Robert P. Lenart, Esq.; Pietragallo, Bosick & Gordon

(57) ABSTRACT

A method of recording information bits in a magnetic storage medium, the method comprising positioning a first conductor adjacent to a magnetic recording medium, the conductor having a width and a length, wherein a distance between the first conductor and the magnetic recording medium is less than or equal to the width and the length, and passing a first current through the conductor of sufficient magnitude to produce a magnetic field in the magnetic medium greater than one Tesla and having a magnetic field gradient in a cross track direction and a down track direction greater than 100 Oe/nm over a bit dimension. The thickness of the first conductor can be less than or equal to the distance between the first conductor and the magnetic recording medium. The current density in the conductor can be greater than $10^9$ ampere/cm$^2$, and the length of the conductor can be less than 100 nm. The current can be applied as one or more pulses in a predetermined clock cycle time. The magnetic field can be augmented by using an additional conductor, an adjacent ferromagnetic film, and/or a magnetic yoke and coil. Magnetic recording heads and disc drives that record data in accordance with the method are also included.

26 Claims, 17 Drawing Sheets

U.S. PATENT DOCUMENTS

| | | | |
|---|---|---|---|
| 4,771,350 A | | 9/1988 | Desserre |
| 5,239,425 A | | 8/1993 | Kazama |
| 5,434,831 A | | 7/1995 | Ishii et al. |
| 5,491,338 A | * | 2/1996 | Spitzer ................... 250/307 |
| 5,696,372 A | | 12/1997 | Grober et al. |
| 6,278,679 B1 | | 8/2001 | Weiss et al. |
| 6,493,183 B1 | * | 12/2002 | Kasiraj et al. .......... 360/126 |
| 2001/0027603 A1 | | 10/2001 | Komuro et al. |
| 2003/0021063 A1 | * | 1/2003 | Kuroda et al. .......... 360/125 |
| 2003/0021191 A1 | * | 1/2003 | Hsu et al. ............. 369/13.17 |

OTHER PUBLICATIONS

*Patent Abstracts of Japan*, vol. 015, No. 075 (P–1169), Feb. 21, 1991 & JP 02 294903 A (Mitsubishi Electric Corp.), Dec. 5, 1990 abstract.

P. M. Marcus, "Currents and Fields in a Superconducting Film Carrying a Steady Current," *Proc. Seventh Intern. Conf. Low Temp. Phys.*, (University Press, Toronto, 1961), pp. 418–421.

R. Blum et al., "Electricity, Magnetism, and Light," *Physics: Volume Two*, 1982, pp. 1194–1195, and 1212.

H. N. Bertram, "Theory of Magnetic Recording," *Cambridge University Press*, 1994, pp. 56–63.

E. B. Myers et al., "Current–Induced Switching of Domains in Magnetic Multilayer Devices," *Science*, vol. 285, Aug. 6, 1999, pp. 867–870.

J. A. Katine et al., "Current–Driven Magnetization Reversal and Spin–Wave Excitation in Co/Cu/Co Pillars," *Physical Review Letters*, vol. 84, No. 14, Apr. 3, 2000, pp. 3149–3152.

B. Q. Wei et al., "Reliability and Current Carrying Capacity of Carbon Nanotubes," *Applied Physics Letters*, vol. 79, No. 8, Aug. 20, 2001, pp. 1172–1174.

* cited by examiner

RECORDING HEADS USING MAGNETIC FIELDS GENERATED LOCALLY FROM HIGH CURRENT DENSITIES IN A THIN FILM WIRE

CROSS REFERENCE TO RELATED APPLICATION

This application claims the benefit of U.S. Provisional Application No. 60/315,467, filed Aug. 28, 2001.

FIELD OF THE INVENTION

The invention relates to recording heads for use with magnetic storage media, and more particularly, to such recording heads that utilize a single conductor for inducing a magnetic write field for longitudinal or perpendicular magnetic recording and to a method for recording data using such recording heads.

BACKGROUND OF THE INVENTION

Longitudinal and perpendicular recording heads for use with a magnetic storage medium are generally known. Longitudinal recording heads utilize a pair of opposing write poles with their tips in close proximity to each other at the bottom surface of the recording head. The two poles are connected at the top by a yoke, which may be made of a ferromagnetic material similar to that used for the poles. A coil having a plurality of turns is located in close proximity to one of the two opposing poles. When a current is passed through the coil, magnetic flux is induced in the yoke, which produces a magnetic field across a write gap, which separates the two poles. A portion of the magnetic flux across the write gap passes through the magnetic storage medium, thereby causing a change in the magnetic state within the magnetic storage medium where the head field is higher than the medium coercive force. The medium coercive force is chosen high enough so that only the head fields across a narrow gap between the poles, modify the bits of information on the storage medium.

The bits of information are recorded on the disc along concentric tracks that are separated by guard bands. The width of the track, plus that of the guard band in which no information is stored, defines the track density. The length of the bit along the track defines the linear density. The total storage capacity is directly proportional to the product of track density and linear density. Recording densities possible with longitudinal recording are believed to be limited to approximately 50 to 100 Gbit/inch$^2$, because at higher recording densities, superparamagnetic effects result in magnetic instabilities within the magnetic storage medium.

Perpendicular recording has been proposed to overcome the recording density limitations of longitudinal recording. Perpendicular recording heads for use with magnetic storage media may include a pair of magnetically coupled poles, including a main write pole having a small bottom surface area and a flux return pole having a large bottom surface area. A coil having a plurality of turns is located adjacent to the main write pole for inducing a magnetic field between that pole and a soft underlayer. The soft underlayer is located below the hard recording layer of the magnetic storage medium and enhances the amplitude of the field produced by the main pole. This in turn allows the use of storage media with higher coercive force. Consequently, more stable bits can be stored in the medium. In the recording process, an electrical current in the coil energizes the main pole, which produces a magnetic field. The image of this field is produced in the soft underlayer to enhance the field strength produced in the magnetic medium. The magnetic flux emerges from the write pole tip, passes into the soft underlayer, and returns to the main pole through the return flux pole. The return pole is located sufficiently far from the main pole such that fringing flux between the main pole and the return pole does not affect the magnetization of the magnetic medium.

As bit-areal densities in magnetic recording continue to increase in an effort to increase the storage capacity of hard disc drives, magnetic transition (bit) dimensions and, concomitantly, recording head critical features are being pushed below 100 nm. A parallel effort to make the recording medium stable at higher areal densities requires magnetically harder (high coercivity) medium materials. Traditionally, writing to a harder medium has been achieved by increasing the saturation magnetization, or $4\pi M_s$ value, of the magnetic material of the inductive write head, thus bolstering the magnetic field applied to the medium. Though there has been some success in materials research efforts to increase $M_s$ of the write head, the rate of increase is not significant enough to sustain the annual growth rate of bit areal densities in disc storage. A parallel effort to writing to progressively harder media is to locally reduce the coercivity of the media during the writing process. Typically, this would be accomplished by locally heating the medium (by optical, or, more generally, electromagnetic stimulation) to lower its temperature-dependent coercivity during the writing process. This technique has thus far been limited to proof of concept laboratory demonstrations, and requires numerous technological advances in both head design and disc materials. Accordingly, there is a need for a recording head that is capable of overcoming the coercivity of a magnetic medium appropriate for the next generation, and beyond, in recording technology, which has the benefit of manufacturability.

SUMMARY OF THE INVENTION

This invention provides a method of recording information bits in a magnetic storage medium, the method comprises positioning a first conductor adjacent to a magnetic recording medium, the conductor having a width and a length, wherein a distance between the first conductor and the magnetic recording medium is less than or equal to the width and the length, and passing a first current through the conductor of sufficient magnitude to produce a magnetic field in the magnetic medium greater than one Tesla and having a magnetic field gradient in the cross track direction and down track direction greater than 100 Oe/nm over a bit dimension. The current density in the conductor can be greater than $10^9$ ampere/cm$^2$, and the length of the conductor can be less than 100 nm. The current can be applied as one or more pulses in a predetermined clock cycle time. The magnetic field can be augmented by using an additional conductor, an adjacent ferromagnetic film, and/or a magnetic yoke and coil. The first conductor can have a thickness that is less than the distance between the conductor and the magnetic recording medium.

The invention also encompasses a recording head for use with a magnetic storage medium, comprising a first conductor having a width and a length, means for positioning the first conductor adjacent to a magnetic recording medium, wherein a distance between the first conductor and the magnetic recording medium is less than or equal to the width and the length, and means for passing a first current through the first conductor of sufficient magnitude to produce a magnetic field in the magnetic medium greater than one Tesla and a magnetic field gradient in the cross track direction and down track direction greater than 100 Oe/nm over a bit dimension. The recording head can further include a second conductor parallel to the first conductor, a ferromagnetic layer adjacent to the first conductor, a magnetic yoke structure, a means for reducing coercivity of the medium, or a combination of these structures.

Another aspect of the invention includes a magnetic disc drive storage system comprising a housing, means for supporting a magnetic storage medium positioned in the housing, and means for positioning a recording head adjacent to said rotatable magnetic storage medium, the recording head comprising a first conductor having a width and a length, wherein the distance between the first conductor and the magnetic recording medium is less than or equal to the width and the length, and means for passing a first current through the first conductor of sufficient magnitude to produce a magnetic field in the magnetic medium greater than one Tesla and a magnetic field gradient in the cross track direction and down track direction greater than 100 Oe/nm over a bit dimension. The recording head can further include a second conductor parallel to the first conductor, a ferromagnetic layer adjacent to the first conductor, a magnetic yoke structure, a means for reducing coercivity of the medium, or a combination of these structures. The first conductor can have a thickness that is less than the distance between the conductor and the magnetic recording medium.

This invention provides a magnetic recording method and apparatus capable of generating magnetic fields on order of a Tesla, with field gradients of at least 100 Oe/nm, and at data rates of nearly a GHz and beyond. The invention utilizes local fields resulting from current in the conductor to effect the writing of data bits in the magnetic recording medium. The local fields are produced at distances from the air bearing surface of the conductor that are less than or equal to the largest conductor dimension.

DETAILED DESCRIPTION OF THE INVENTION

Figure 1:
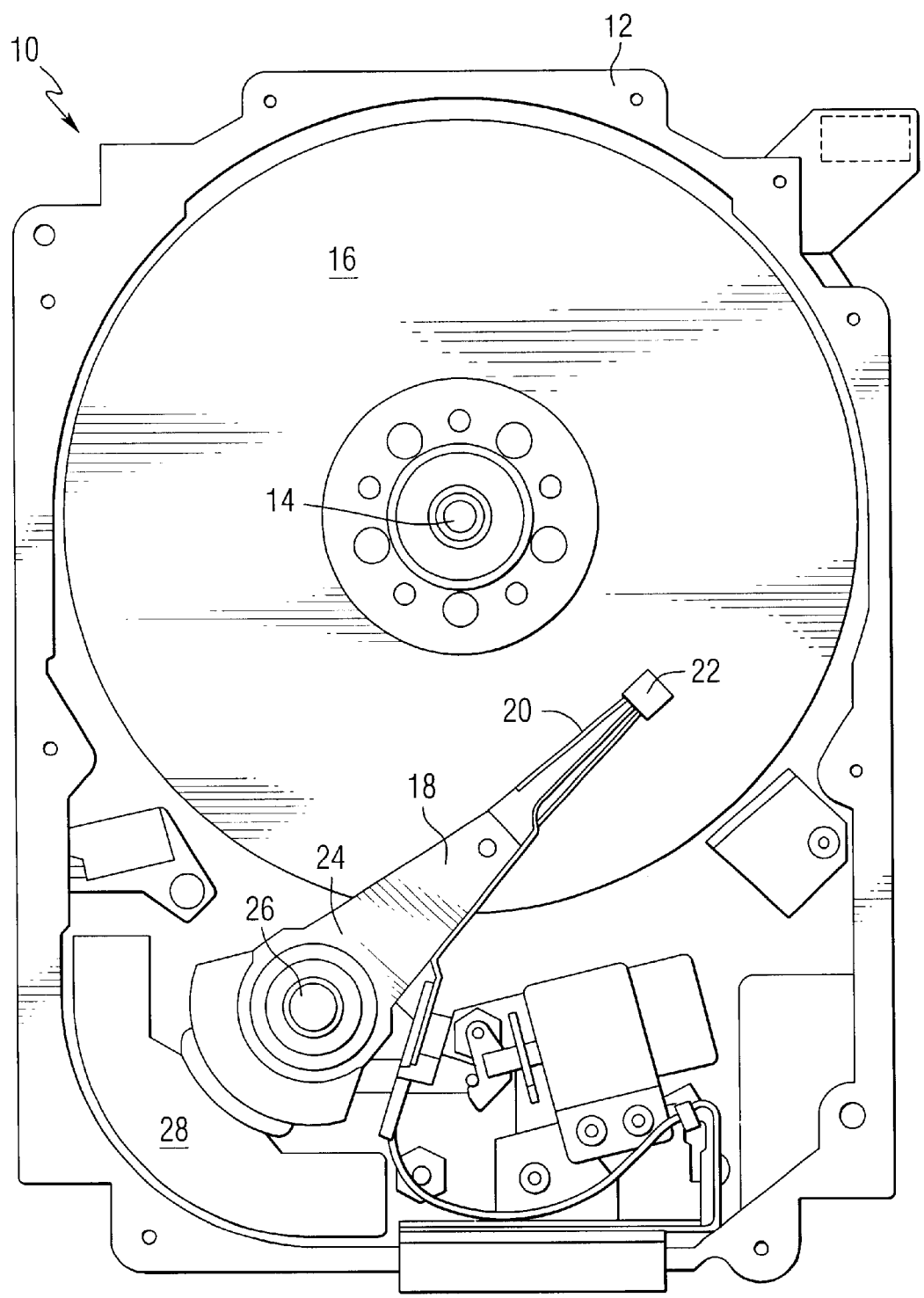
FIG. 1 is a pictorial representation of a disc drive that can use a recording head constructed in accordance with this invention.

Referring to the drawings, FIG. 1 is a pictorial representation of a disc drive 10 that can use a recording head constructed in accordance with this invention and can record data in accordance with the method of this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be constructed for either longitudinal or perpendicular magnetic recording, within the housing. At least one arm 18 is contained within the housing 12, with the arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is regulated by a controller, which is not shown in this view and is well known in the art.

This invention provides a method and apparatus for generating local magnetic fields by way of high current densities in thin-film wires, such that the flux density, field gradients and data rates would be sufficient to be used for magnetic recording. We refer to such a magnetic recording head as an Ampere head, as we can calculate the field generated by a current carrying wire of very simple geometry using Ampere's law. For example, a thin wire of thickness, t (along a z-axis), that is small compared to its width, w (along an x-axis), carrying a current, I (at a current density J, of J=I/ t·w), generates a magnetic field near its surface (within a distance from the edge or surface of the wire small compared to w) with magnitude given by, $$H \cong \frac{\mu_o I}{2w} = \frac{\mu_o J \cdot t}{2} \qquad (1)$$

where $\mu_o$ (=4π×10$^{-7}$ Wb/A·m) is the permeability of free space.

Figure 2:
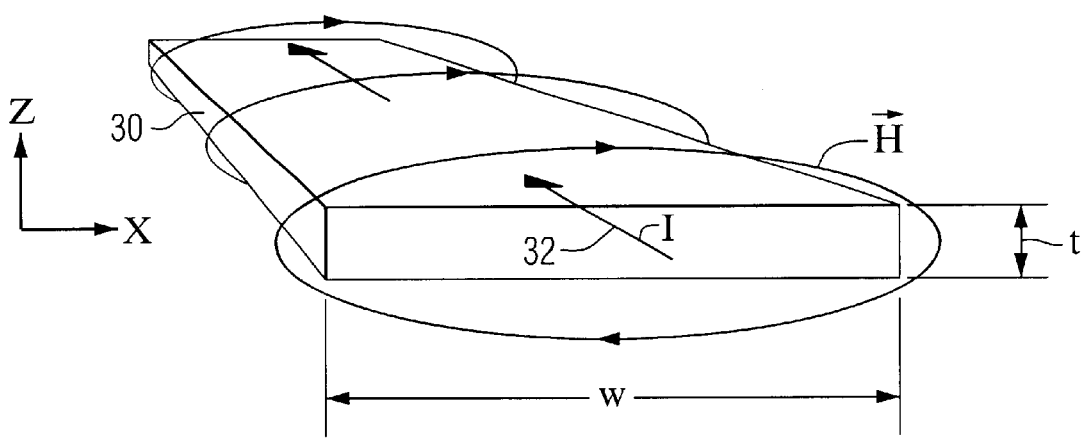
FIG. 2 is a perspective view of a conductor that illustrates the operation of the invention.

FIG. 2 is a perspective view of a conductor 30 that illustrates the operation of the invention. A current I passing through the conductor in the direction indicated by arrow 32 creates a magnetic field H in the vicinity of the conductor. The conductor has a width w and a thickness t. In the figure, the vertical direction is labeled as the z direction and the horizontal direction is labeled as the x direction.

Figure 3:
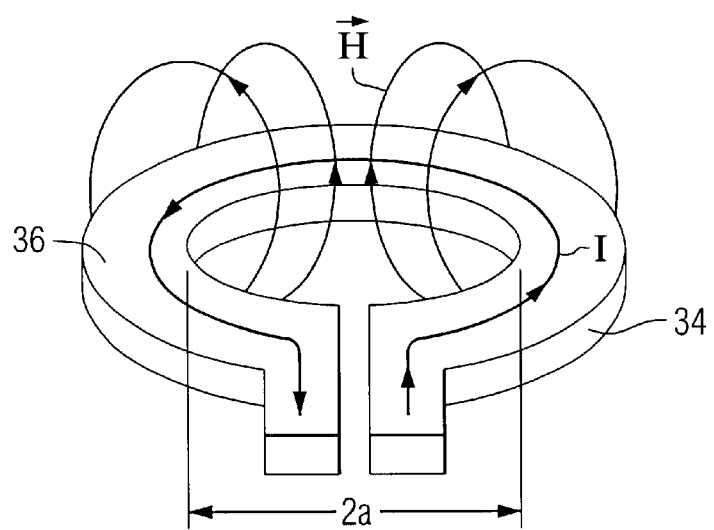
FIG. 3 is a perspective view of another conductor that illustrates the operation of the invention.

FIG. 3 is a perspective view of another conductor 34 that illustrates the operation of the invention. A current I passing through the conductor in the direction indicated by arrow 36 creates a magnetic field H in the vicinity of the conductor.

Equation 1 is a good estimate for the field magnitude of a thin-film wire, like that of FIG. 2. What this equation does not describe, but equally important to the recording process, is the field profile and, in particular, the field gradient associated with such a source. A large field gradient allows the recording head to write a track with sharp transitions between adjacent bits in both down track and across track directions, i.e. the transition is short compared to the bit length and track spacing.

Figure 4:
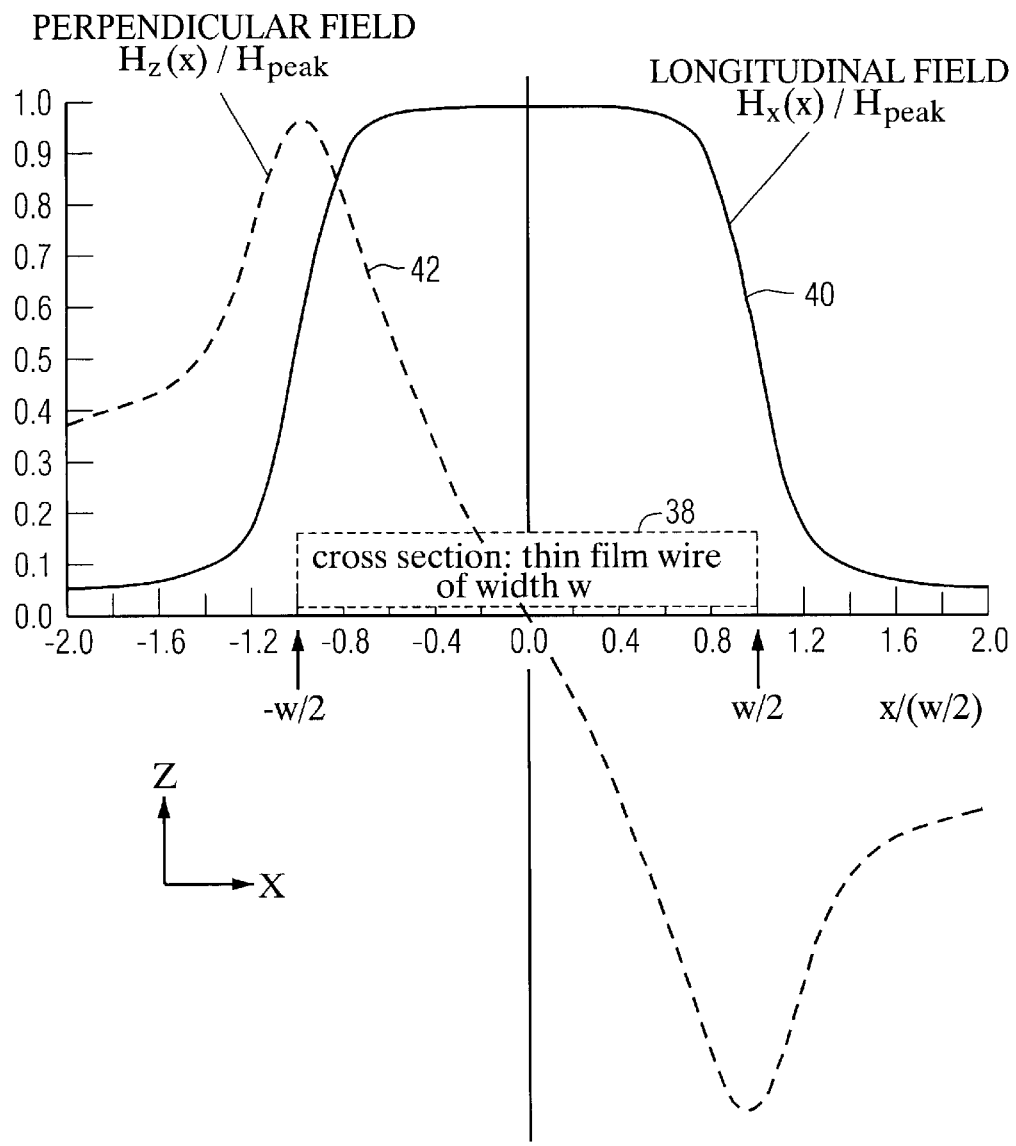
FIG. 4 is a graph of a magnetic field profile of a current-carrying thin film wire that illustrates the operation of the invention.

FIG. 4 is a graph of a calculated magnetic field profile of a current-carrying thin film wire that illustrates the operation of the invention. A rectangular cross-section of a conductor having a width of ten times the thickness is shown as item 38. Curve 40 represents the longitudinal magnetic field in the vicinity of the conductor resulting from a current flowing through the conductor. Curve 42 represents the perpendicular magnetic field in the vicinity of the conductor resulting from a current flowing through the conductor. As shown in FIG. 4, the magnetic field distribution produced by the current in the wire is essentially a Karlqvist field distribution.

The field lines are largely parallel, or longitudinal, to the thin film wire plane toward the middle of the wire, and they have a large perpendicular component near the edges. The field magnitude for such a current carrying wire falls off on a length scale comparable to its width, so the large field gradients needed for magnetic recording can be achieved with the appropriate choice of wire geometry and dimensions. In fact, the field profile for a current carrying thin film wire is very much like that of an inductive longitudinal head. The current carrying wire loop depicted in FIG. 3 generates a perpendicular field near its center with magnitude given approximately by, $$H \cong \frac{\mu_o I}{2a}, \qquad (2)$$

where 2a is the inner diameter of the loop with wire thickness t<<2a, and a width w less than or comparable to 2a. The flux density is large near the center of the loop and falls off quickly outside the inner loop diameter, again, on a length scale comparable to a or w. Both Equations 1 and 2 show that for a fixed current, the field magnitude increases inversely with wire dimensions, thus an Ampere head has inverse scalability. The typical pre-amp for a disc drive recording head can deliver a current up to about 100 mA. Thus the current limit is essentially fixed, and a wire carrying such a current can only generate a substantial field (>1 Tesla) once its lateral dimensions are about 100 nm, and less. For example, at I=100 mA, w=100 nm (and/or a=100 nm), and t=30 nm, we have H≅0.63 T (=6.3 kOe) at a current density of J=3.3×10$^9$ A/cm$^2$. For I=100 mA, w=25 nm (and/or a=25 nm), and t=8 nm, we have H≅2.5 T at a current density of J=5×10$^{10}$ A/cm$^2$. In general, the head to media spacing (htms) should be approximately less than or equal to the width and length of the wire, but greater than or equal to the wire thickness. The purpose of the wire width and length being greater than or equal to the htms is to minimize the loss of magnetic field strength as one moves away from the surface of the wire, where the field is a maximum (the local field). The field magnitude falls off on a length scale comparable to the wire dimensions w and 1, such that for htms less than w, 1 the loss in magnitude is minimized. On the other hand, the wire thickness being less than htms acts to concentrate all the current as close as possible to the media. A thicker wire moves current elements away from the media, resulting in a significant loss in field magnitude from those elements, which is an inefficient use of the current. In general, the wire width determines the down track bit definition and should be approximately equal to the bit length, while the wire length determines the cross track definition and should be approximately equal to the track width in the magnetic media. We summarize these design features of our invention with the following equation:

$$t \leq htms \leq w; \quad 1 \approx \text{bit length, track width, respectively.} \qquad (3)$$

Recent experiments have demonstrated that current densities of this order of magnitude are, indeed, achievable in thin film structures on this size scale. Current densities in excess of 10$^9$ A/cm$^2$ have been demonstrated in thin-film wire stacks of length and width of the order of 100 nm, or less, using a continuous current bias. The stacks are essentially thick metal films separated by a thin insulating layer (~100 nm thickness) but brought into electrical contact with each other at a single point, to form a metal stack of approximately 100 nm diameter and length.

We propose that wires with similar geometries and dimensions (and smaller) can be designed and fabricated to carry considerably larger current densities, exceeding $10^{10}$ A/cm$^2$. For example, a low resistivity ($\rho$), high thermal conductivity material such as Au, Ag or Cu for the wire minimizes Ohmic ($I^2R$, $R=\rho \sim 1/t \cdot w$) heating, and short-time scale (non continuous) current pulses (of duration $\tau_m$ limited by the media dynamic response) can be employed to further minimize the energy dissipated in the wire, the primary limitation to the current carrying capacity of a wire. Because of the small wire dimensions, and the single-turn geometries that will be discussed below for the write heads, the inductances of such wires would be very small, less than a picoHenry, with correspondingly short response times, on the order of picoseconds. Also, the intrinsic electronic response time (relaxation time $\tau_e$) is sub-picosecond in most metals, and thus, not a limiting factor. Thus, current pulses of picosecond duration can easily be applied to these wires without loss of integrity of the (high-speed) signal.

There are many advantages to an Ampere wire write head, such as the use of simple single-element materials, like Au, Ag or Cu, for a wire. The upper limit for field magnitude is essentially unbounded as predicted by equations 1 and 2, and the response time of such a head should be very short compared to the dynamics of the magnetic materials in the recording medium. In fact, the high-speed capability of an Ampere head could be used to drive the dynamics of the recording medium, allowing for the advance of data rates well beyond a GHz. Thus, as the size scale of magnetic recording heads continue to shrink, and within the constraints of the available technology, a current carrying wire becomes a viable way to generate and modulate the local magnetic fields needed to write magnetic transitions in a recording medium at areal densities and data rates that advance magnetic recording well into the future.

In FIG. 4 we provide a sketch of the normalized field amplitude (as a function of position along the direction parallel to the width of the wire, x-axis) from a current carrying wire having width w much larger than its thickness, t (w=10t). The longitudinal field component is relatively flat across the width of the wire except near the edge where it has a large derivative. The perpendicular component has a large derivative at nearly all points along the width direction. In fact, as pointed out earlier, this field profile is virtually indistinguishable from the field distribution across the gap of a longitudinal inductive writer with a gap equal to the wire width. For example, the relevant longitudinal and perpendicular (down-track) field gradients for the wire of FIG. 2 can be estimated by assuming a peak field value of 1 Tesla and a wire width w=100 nm, yielding gradients of at least 200 Oe/nm, which is comparable to that of an inductive writer. Cross-track field gradients of this same magnitude are explicit in the wire loop designs discussed herein (see FIGS. 8, 9, 10, 20, 21, 25 and 26), and, with appropriate wire geometry, should be achievable with any of the Ampere heads proposed. Thus, a wire as a local field source can, indeed, be designed to generate the field distribution and field gradients necessary for the recording process. The field magnitude that can be generated by a wire is ultimately limited by the current density it can sustain without "melting". Equation 1 does not describe an upper bound in field magnitude. This is ultimately dictated by many design and operation parameters, some of which we discuss below as methods for attaining very high fields from a wire.

Figure 5:
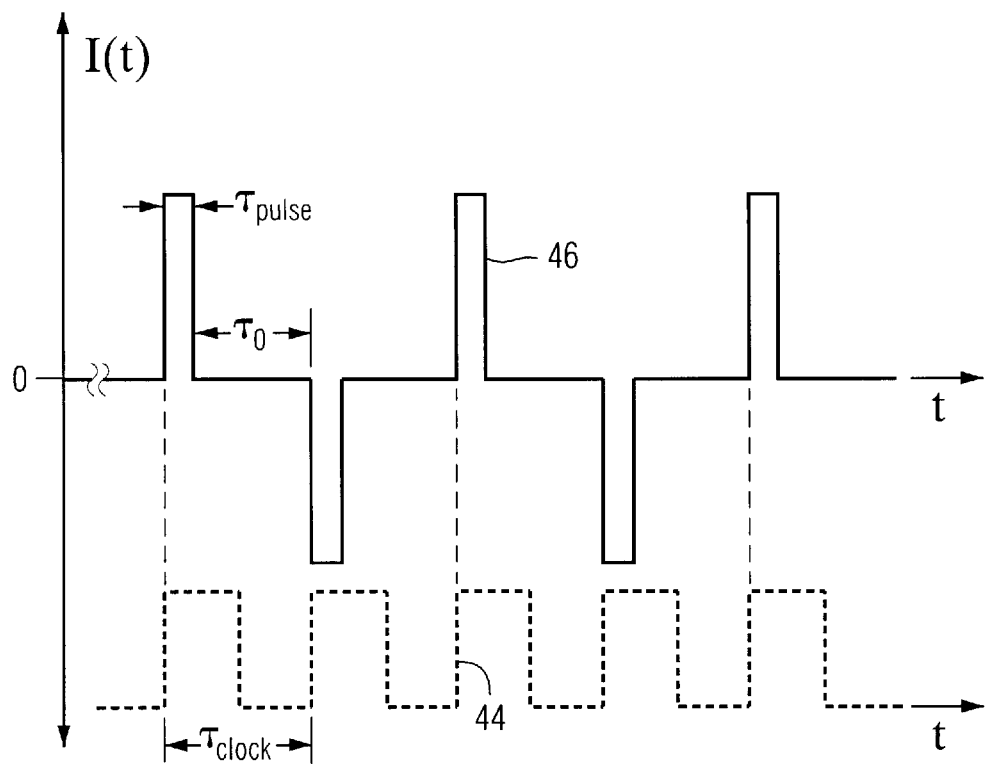
FIG. 5 is a timing diagram that illustrates the operation of the invention.

FIG. 5 is a diagram that illustrates the timing of voltage pulses during operation of the invention. Curve 44 represents a series of clock pulses. Curve 46 represents a series of current pulses. The practical upper limit for current density in a wire has not been established, but densities greater than $10^9$ A/cm$^2$ using a constant current bias have already been demonstrated in structures of a geometry and size scale appropriate for an Ampere head. To maximize a wire's current capacity, it should be an excellent electrical and thermal conductor, like Au, Ag or Cu, and good thermal conductors should surround it. The length of wire used for generating the large magnetic fields should be as short as possible, since any extra length unnecessarily increases the wire resistance. The electrical contacts to the wire should also be made with a material like Au, Ag or Cu to allow for efficient removal of the heat generated in the wire, and the dimensions of the contacts should be very large compared to the wire. In addition, the device should be imbedded in an electrically insulating material with as large a thermal conductivity as can be engineered, such as aluminum nitride, to further aid in drawing heat away from the wire. However, at some point Ohmic heating in the wire will, indeed, necessitate cycling the current off to allow the heat to dissipate without damaging the wire. The shorter the duration that the current is applied to the wire, the higher the current density that can be applied. A pre-amp capable of generating nearly 100 mA with the approximate time dependence of that depicted in FIG. 5 on a sub-nanosecond timescale is realizable with present technology, and we propose a scheme like that in FIG. 5 for applying current to an Ampere head to maximize the current density it can sustain.

Current pulses need only be of duration $\tau_{pulse}$ equal to the time needed to switch the magnetization of the medium (magnetic response/switching time $\tau_m \leq \tau_{pulse}$). The clock cycle time $\tau_{clock}$ (~inverse of the data rate, ~GHz) would be at least as long as the pulse duration, as two pulses of opposite current polarity would be generated every two clock cycles, so we have $\tau_{clock} \geq \tau_{pulse}$. The zero-current time $\tau_0$, or cooling time, is given by $\tau_0 = \tau_{clock} - \tau_{pulse}$, and this time will be dictated by the current density and pulse duration used. The lower bound to the magnetic switching time is well established to be less than a nanosecond, and could be close to a picosecond for coherent magnetization rotation. If a current pulse of duration of the order of picosecond is used in order to achieve higher current density and, thus, higher field generation, the pulse duration may be very short compared to a practical clock cycle ($\tau_{clock} \approx \tau_{pulse}$). In this case the Ampere head would write by making a magnetic footprint in the medium, where a bit in the medium would be a sort of "snapshot" of the field distribution of the whole head where it exceeds the coercivity of the medium. If $\tau_{clock} = \tau_{pulse}$ is realizable, then the Ampere head would operate like a traditional inductive writer where a bit is defined when the charged head is "dragged" across a length of the medium over a clock cycle, and then the polarity of the head is reversed in the next clock cycle.

The field distributions of FIG. 4 demonstrate that at different points in space the wire generates an "off-axis" field direction (vector) where "off-axis" refers to a vector having both an in-plane (longitudinal) component and an out-of-plane (component). An "off-axis" magnetic field vector may be desirable for the magnetic recording process as a way to induce coherent rotation of the magnetization in the media. It is well established that when the symmetry along a given spatial axis is broken by the magnetic field being applied to reverse the magnetization along that axis, magnetization reversal along the axis progresses coherently, taking minimal time to reverse the magnetization. This can also be brought about with a sequence of current pulses timed so as to apply multiple field pulses to the media during a single writing process to enhance the writing both in terms of the time it takes to write a transition and the field magnitude needed. As discussed above, the magnetic field from a wire can be applied on very short timescales (~picosecond), so that a sequence of field pulses during a single writing process can readily be applied. Such a sequence can easily be incorporated into the timing scheme depicted in FIG. 5, where multiple sequential pulses (of the same polarity, but possibly different magnitudes and duration) would be applied during a clock cycle. Thus, we propose using an Ampere head for such an "off-axis" vector field approach to writing, either by a single magnetic field application per written magnetic transition, or by applying a sequence of magnetic field pulses during a single writing process. The duration of the current pulses can be much shorter than the clock period.

Figure 6:
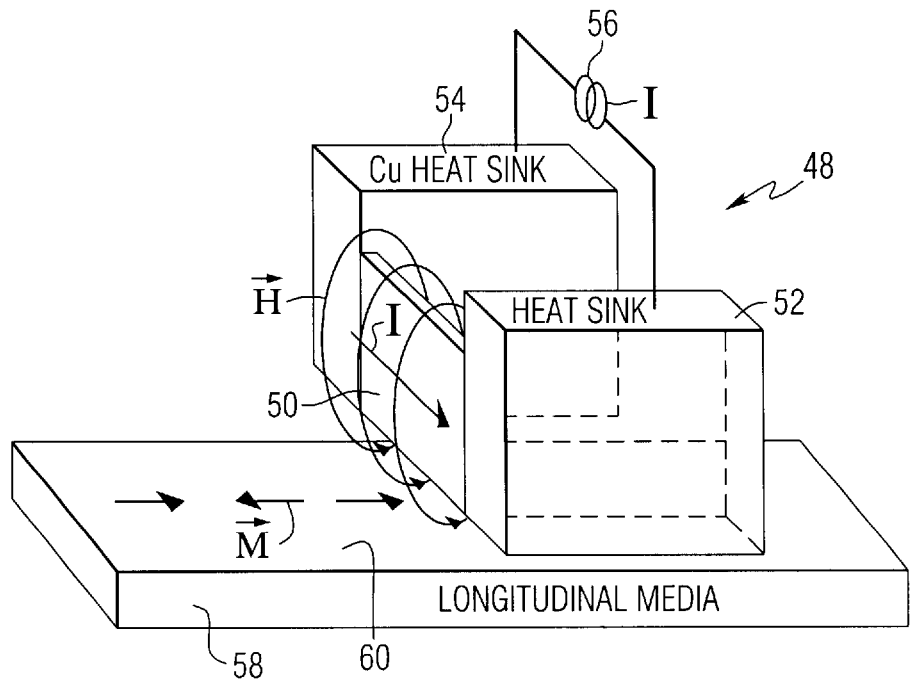
FIG. 6 is a pictorial representation of a longitudinal recording head constructed in accordance with the invention.

FIG. 6 is a pictorial representation of a longitudinal recording head 48 constructed in accordance with the invention. The head includes a linear conductor 50 having a rectangular cross-section, positioned between and electrically connected to two conductive heat sinks 52 and 54. The cross-sectional area of the heat sinks is much greater than that of the conductor 50. A current source 56 supplies current to the heat sinks, and the conductor. In operation, the head would be positioned adjacent to a magnetic recording medium 58 and separated from the medium by an air bearing 60. Current in the conductor creates a magnetic field H that has sufficient strength to affect the magnetization of the magnetic recording medium. The current density in the heat sinks is much lower than the current density in the conductor 50. In the structure of FIG. 6, the conductor is oriented such that the direction used to measure the thickness is parallel to the surface of the recording medium. This will be referred to as a parallel orientation.

Figure 7:
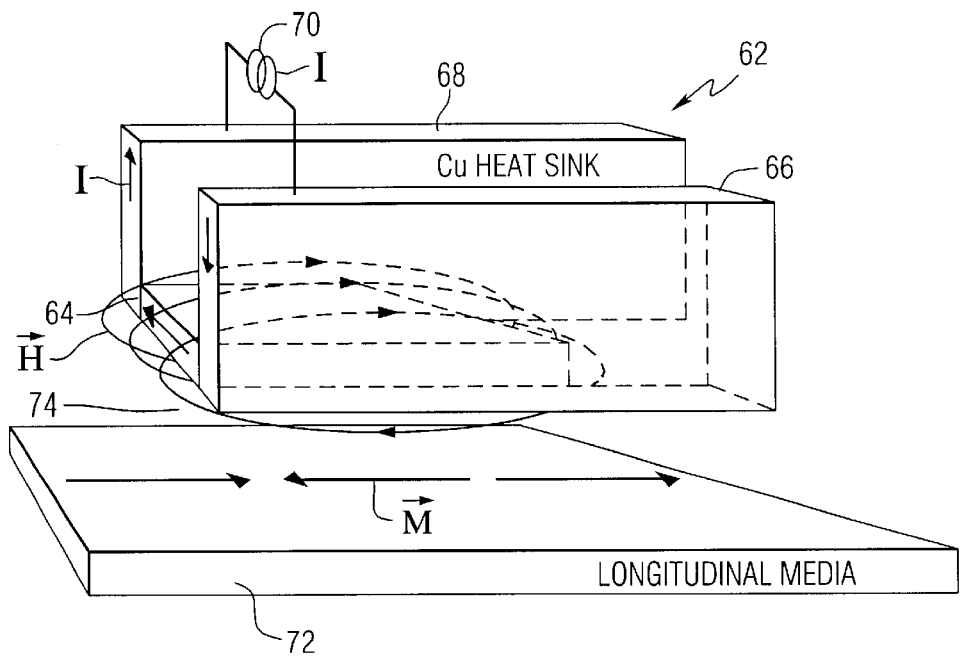
FIG. 7 is a pictorial representation of another longitudinal recording head constructed in accordance with the invention.

FIG. 7 is a pictorial representation of another longitudinal recording head 62 constructed in accordance with the invention. The head includes a linear conductor 64 having a rectangular cross-section, positioned between and electrically connected to two conductive heat sinks 66 and 68. A current source 70 supplies current to the heat sinks, and the conductor. In operation, the head would be positioned adjacent to a magnetic recording medium 72 and separated from the medium by an air bearing 74. Current in the conductor creates a magnetic field H that has sufficient strength to affect the magnetization of the magnetic recording medium. In the structure of FIG. 7, the conductor is oriented such that the direction used to measure the thickness is perpendicular to the surface of the recording medium. This will be referred to as a perpendicular orientation.

As discussed earlier, at current densities in the wire exceeding $10^{10}$ A/cm$^2$ the field magnitude is comparable to that of an inductive magnetic recording head, H~2 Tesla. Thus, in FIGS. 6 and 7 we depict wire geometries that can be used as longitudinal write heads. The direction of current flow dictates the magnetic field orientation, and we demonstrate two possible orientations in FIGS. 6 and 7. Reversing this current concomitantly reverses the magnetic field direction, and, thus, a modulated current results in a corresponding field modulation that can be used to record a series of opposite polarity magnetic transitions in a recording medium as shown in FIGS. 6 and 7. As mentioned above, contact pads can be constructed of, for example Au, Ag or Cu, to serve as low impedance electrical contacts and low thermal impedance heat sinks. The length of wire (1) used for generating the field should be small compared to the dimensions of these pads, and comparable to the wire width so thermal currents can flow with low impedance to the heat sinks, preventing damage to the wire when high current densities are applied. The magnetic field profile of a thin film current carrying wire sketched in FIG. 4 is virtually indistinguishable from that generated at the write gap of a longitudinal inductive head with gap size comparable to the wire width. An important difference between the two structures of FIGS. 6 and 7 is that in FIG. 6 the thin film wire width is perpendicular to the air bearing surface (ABS) of the slider (that is, parallel to the wafer plane during manufacture of the head) and in FIG. 7 the wire width is parallel to the air-bearing surface. Either wire orientation is viable and throughout this description it is implicit (and in some designs shown explicitly) that both wire geometries can be used with a given Ampere head design. The most appropriate wire orientation can be determined by considering the field profiles discussed above and depicted in FIGS. 2 and 3, as well as by considering the critical dimensions and field amplitudes needed for a given head design, and which orientation is more practical to fabricate. Also, since the standard head build requires a lapping process of the slider, the lapping control (resolution) will dictate which wire orientation can be used. For example, with the wire plane parallel to the ABS the wire thickness (t<<w) is controlled by the lapping process, which may or may not be a viable means for controlling the wire thickness. Thus, with appropriate choice of geometry and critical features of a longitudinal Ampere head, the desired field profile and field gradient should be attainable.

Figure 8:
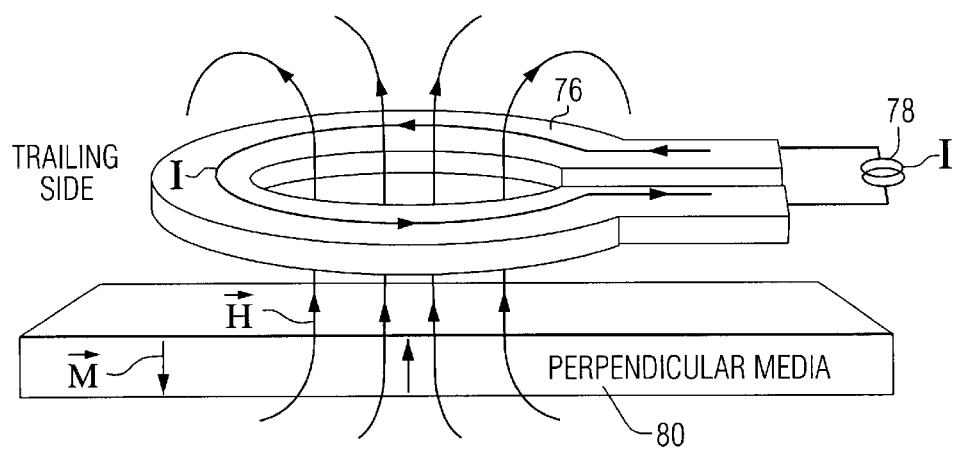
FIG. 8 is a pictorial representation of a current carrying conductor for perpendicular writing in a recording head constructed in accordance with the invention.

FIG. 8 is a pictorial representation of a current carrying conductor 76 for perpendicular writing in recording head constructed in accordance with the invention. The conductor has a generally rectangular cross-section and is shaped to form a loop such that current in the conductor supplied by an external current source 78, creates a magnetic field H that has sufficient strength to affect the magnetization of the magnetic recording medium 80. This creates vertically magnetized regions M in the magnetic recording medium. We schematically depict a wire geometry appropriate for perpendicular recording in FIG. 8. A circular loop allows for the largest differential between the flux density generated at the center of the loop, the high flux density region and the intended write field, and that outside the loop where the flux density is relatively low.

Figure 9:
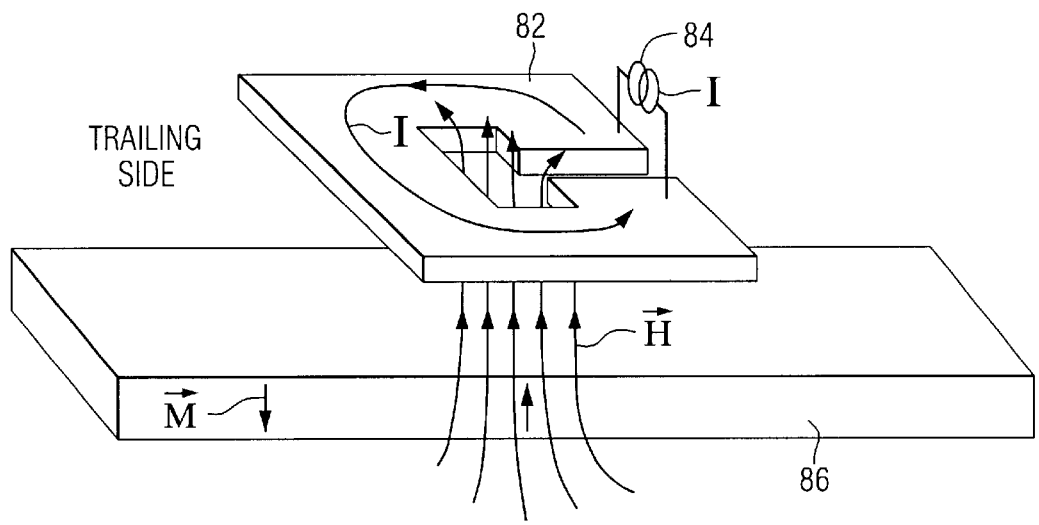
FIG. 9 is a pictorial representation of another current carrying conductor for perpendicular writing in a recording head constructed in accordance with the invention.

FIG. 9 is a pictorial representation of another carrying conductor 82 for perpendicular writing in a recording head constructed in accordance with the invention. The conductor has a generally rectangular cross-section and is shaped to form a loop such that current in the conductor supplied by an external current source 84, creates a magnetic field H that has sufficient strength to affect the magnetization of the magnetic recording medium 86. The rectangular-loop geometry of FIG. 9 has the advantage over the circular loop of being easier to fabricate as a recording head, as the air-bearing surface (ABS) is orthogonal to the plane of a wafer in the head build, making circular structures at the ABS difficult to fabricate. However, the differential between the write field magnitude at the center of the loop and that outside the loop is not as large as that for the circular loop.

Figure 10:
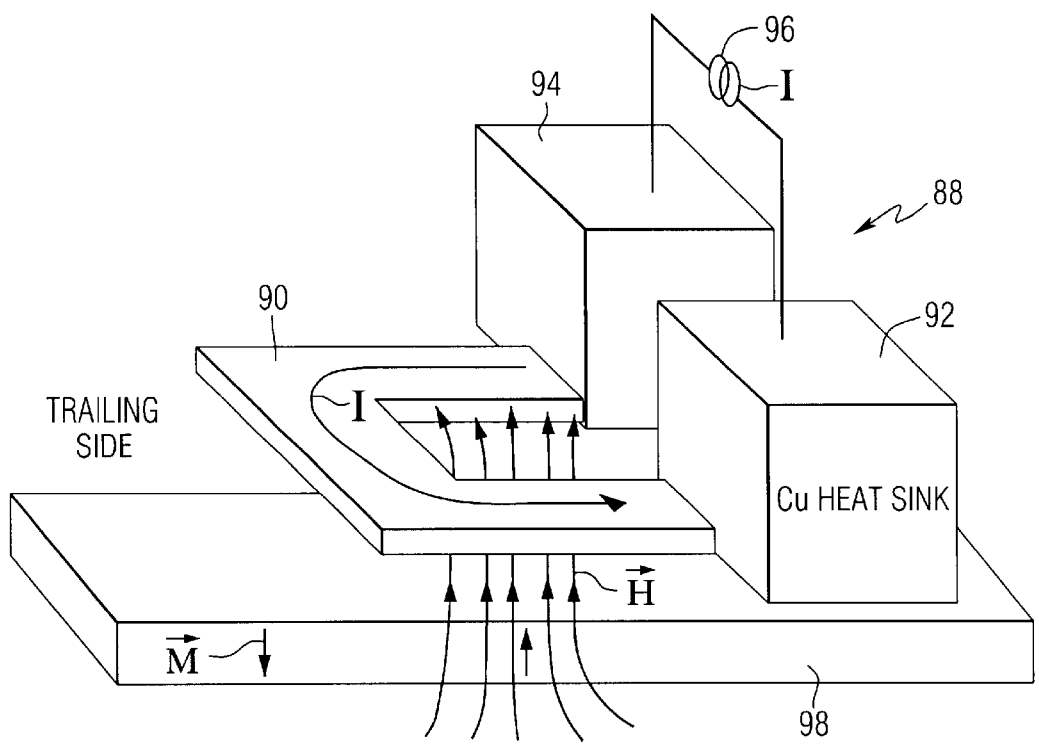
FIG. 10 is a pictorial representation of another recording head for perpendicular writing constructed in accordance with the invention.

FIG. 10 is a pictorial representation of another recording head 88 for perpendicular writing constructed in accordance with the invention. Recording head 88 includes a U-shaped conductor 90 having a generally rectangular cross-section.

The conductor is connected to first and second conducive heat sinks 92 and 94 which receive current supplied by an external current source 96, to create a magnetic field H that has sufficient strength to affect the magnetization of the magnetic recording medium 98. The rectangular-loop geometry of FIG. 10 has the advantage over the circular loop of being easier to fabricate as a recording head, as the air-bearing surface (ABS) is orthogonal to the plane of a wafer in the head build, making circular structures at the ABS difficult to fabricate. As the magnetic medium moves relative to the head, areas of magnetization M are created in the medium.

Figure 11:
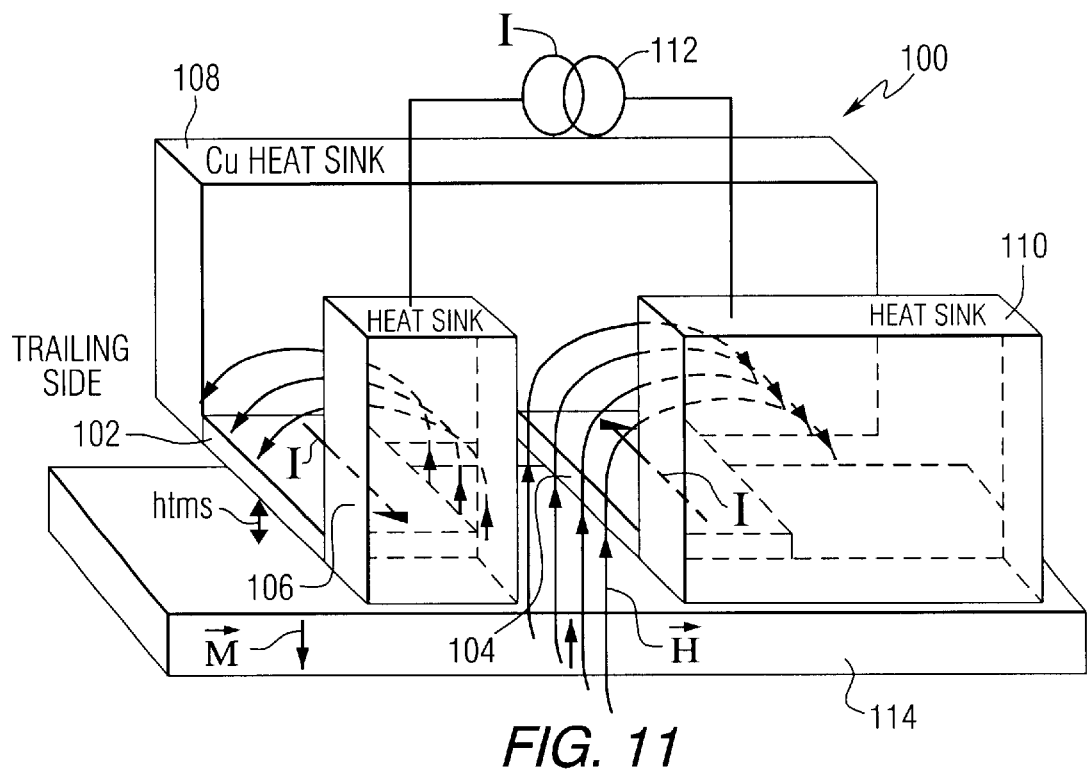
FIG. 11 is a pictorial representation of another recording head for perpendicular writing constructed in accordance with the invention.

FIG. 11 is a pictorial representation of another recording head 100 for perpendicular writing constructed in accordance with the invention. Recording head 100 includes first and second linear conductors 102 and 104, each having a generally rectangular cross-section. A first end of conductor 102 is connected to a first conducive heat sink 106, and a second end of conductor 102 is connected to a second conducive heat sink 108. A first end of conductor 104 is connected to a third conducive heat sink 110, and a second end of conductor 104 is connected to the second conducive heat sink 108. Heat sinks 106 and 110 are connected to receive current supplied by an external current source 112, to create a magnetic field H that has sufficient strength to affect the magnetization of the magnetic recording medium 114.

Figure 12:
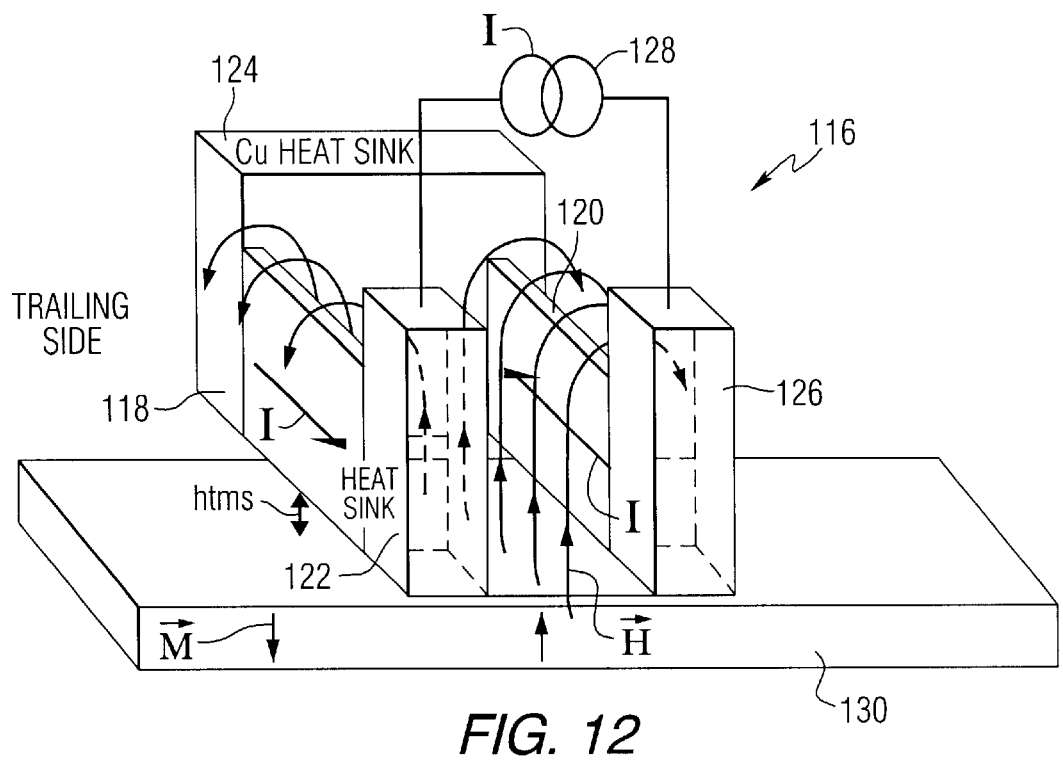
FIG. 12 is a pictorial representation of another recording head for perpendicular writing constructed in accordance with the invention.

FIG. 12 is a pictorial representation of another recording head 116 for perpendicular writing constructed in accordance with the invention. Recording head 116 includes first and second linear conductors 118 and 120, each having a generally rectangular cross-section. A first end of conductor 118 is connected to a first conducive heat sink 122, and a second end of conductor 118 is connected to a second conducive heat sink 124. A first end of conductor 120 is connected to a third conducive heat sink 126, and a second end of conductor 120 is connected to the second conducive heat sink 124. Heat sinks 122 and 126 are connected to receive current supplied by an external current source 128, to create a magnetic field H that has sufficient strength to affect the magnetization of the magnetic recording medium 130.

The write heads of FIGS. 10, 11 and 12 are variations on the rectangular loop that incorporate electrical contacts designed as thermal sinks where thermal currents from Ohmic heating in the wire can flow with low impedance. The framing geometries of FIGS. 11 and 12 allow for the shortest length of wire between heat sinks, minimizing both the electrical and thermal impedance. The pair of wires with a looping current flow, as depicted in FIGS. 11 and 12, generates a predominantly perpendicular field (H) between the wires, while the field direction reverses outside the loop but with a much lower flux density.

Figure 13:
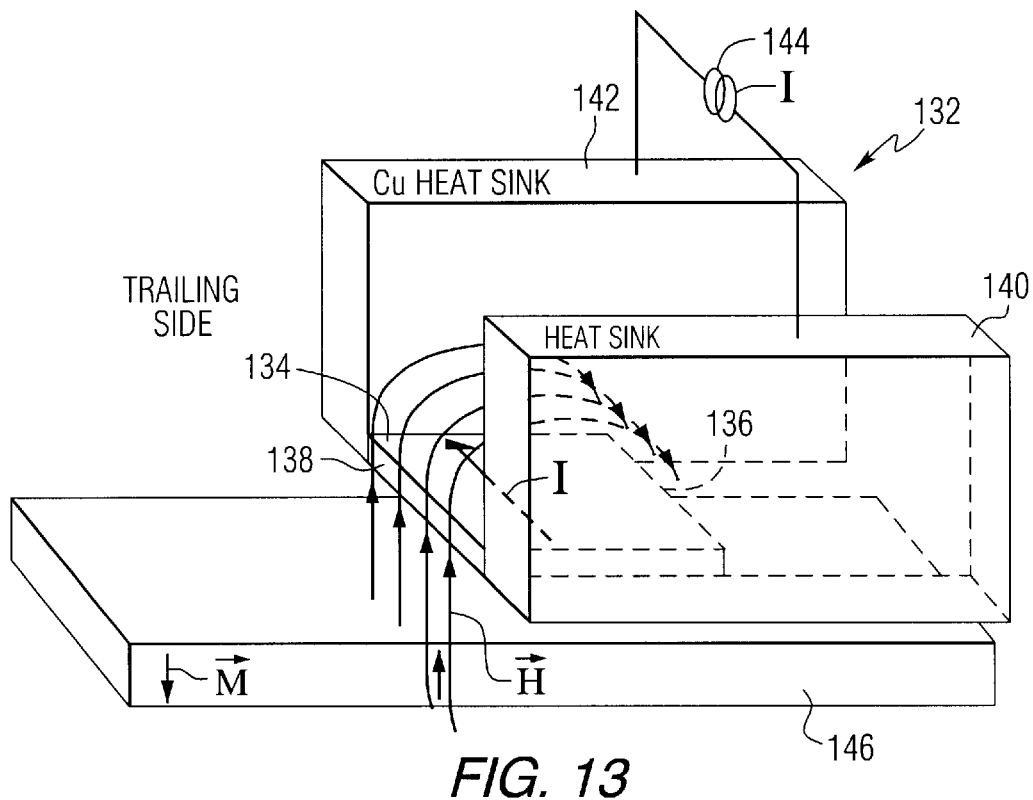
FIG. 13 is a pictorial representation of another recording head for perpendicular writing constructed in accordance with the invention.

FIG. 13 is a pictorial representation of another recording head 132 for perpendicular writing constructed in accordance with the invention. Recording head 132 includes a single conductor 134 having a leading edge 136 and a trailing edge 138, mounted between and electrically connected to first and second heat sinks 140 and 142. An external current source 144 supplies current to the conductor. A single wire write head, such as that depicted in FIG. 13, could also be used for perpendicular recording in the magnetic medium 146, and is the easiest to fabricate.

Figure 14:
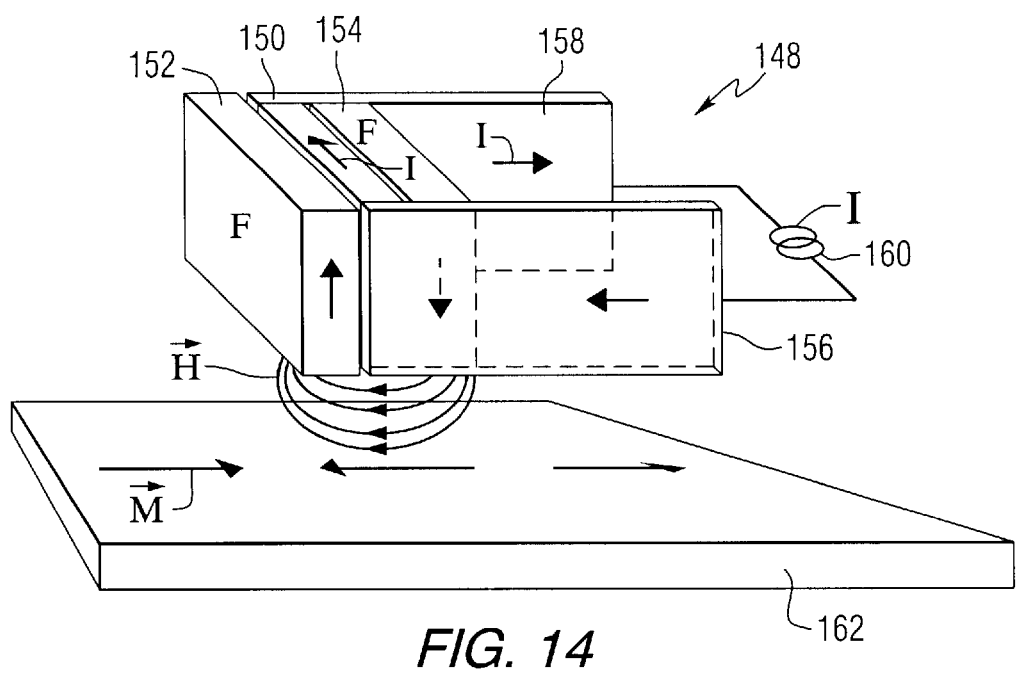
FIG. 14 is a pictorial representation of a recording head for longitudinal writing constructed in accordance with the invention.

FIG. 14 is a pictorial representation of a recording head 148 for longitudinal writing constructed in accordance with the invention. The head 148 includes a linear conductor 150 having a rectangular cross-section. The conductor is positioned between first and second ferromagnetic films 152 and 154. The field distribution of the wire replicates the field distribution across the gap of the longitudinal writer. Thus, the flux density increases and field profile is essentially unchanged. The wire can be placed in a void in the write head to create the same field distribution as the poles of the write head. A first end of conductor 150 is electrically connected to a first conductor 156 and a second end of conductor 150 is electrically connected to a second conductor 158. Conductors 156 and 158 are connected to an external current source 160. A current I flowing in conductor 150 creates a magnetic field H that is of sufficient strength to create longitudinal areas of magnetization M in the magnetic recording medium 162.

Figure 15:
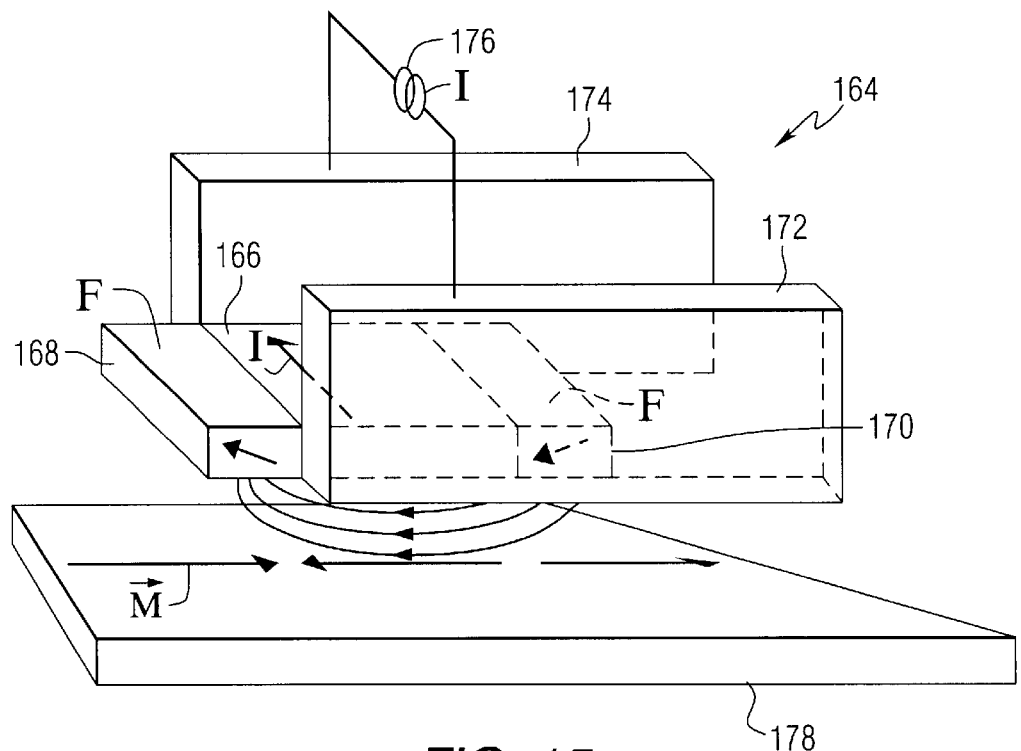
FIG. 15 is a pictorial representation of another recording head for longitudinal writing constructed in accordance with the invention.

FIG. 15 is a pictorial representation of another recording head for longitudinal writing constructed in accordance with the invention. The head 164 includes a linear conductor 166 having a rectangular cross-section. The conductor is positioned between first and second ferromagnetic films 168 and 170. A first end of conductor 166 is electrically connected to a first conductor 172 and a second end of conductor 166 is electrically connected to a second conductor 174. Conductors 172 and 174 are connected to an external current source 176. A current I flowing in conductor 166 creates a magnetic field H that is of sufficient strength to create longitudinal areas of magnetization M in the magnetic recording medium 178.

Figure 16:
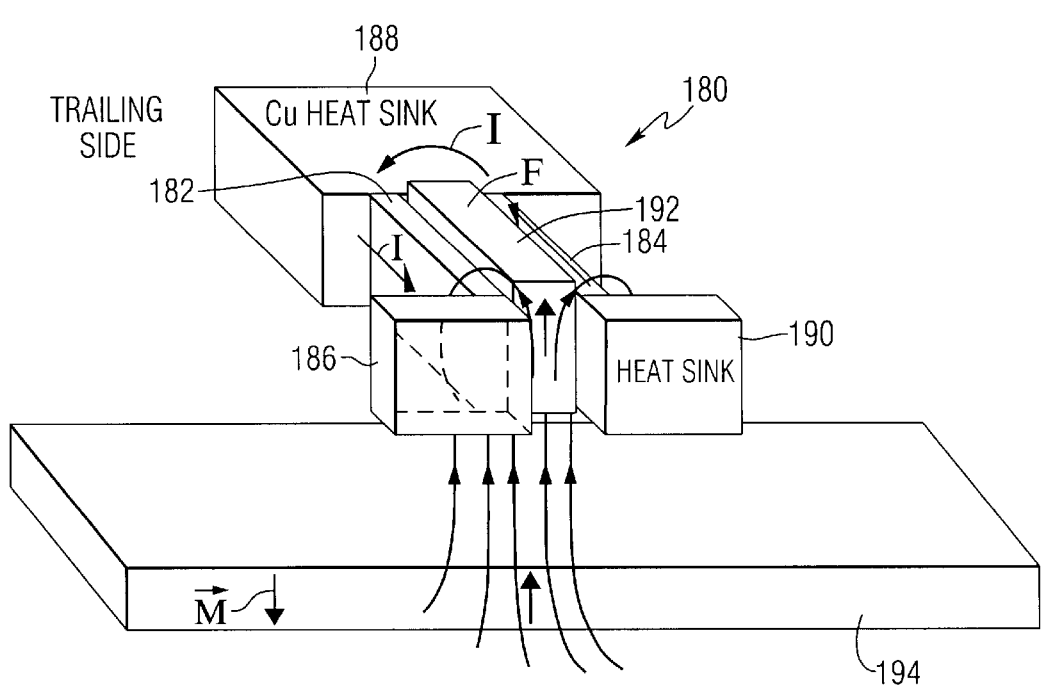
FIG. 16 is a pictorial representation of another recording head for perpendicular writing constructed in accordance with the invention.

FIG. 16 is a pictorial representation of another recording head 180 for perpendicular writing constructed in accordance with the invention. Recording head 180 includes first and second linear conductors 182 and 184, each having a generally rectangular cross-section. A first end of conductor 182 is connected to a first conducive heat sink 186, and a second end of conductor 182 is connected to a second conducive heat sink 188. A first end of conductor 184 is connected to a third conducive heat sink 190, and a second end of conductor 184 is connected to the second conducive heat sink 188. A layer of ferromagnetic material 192 is positioned between the linear conductors. Heat sinks 186 and 190 are connected to receive current supplied by an external current source, to create a magnetic field H that has sufficient strength to affect the magnetization of the magnetic recording medium 194. In FIG. 16, the conductor is oriented perpendicular to the surface of the recording medium.

Figure 17:
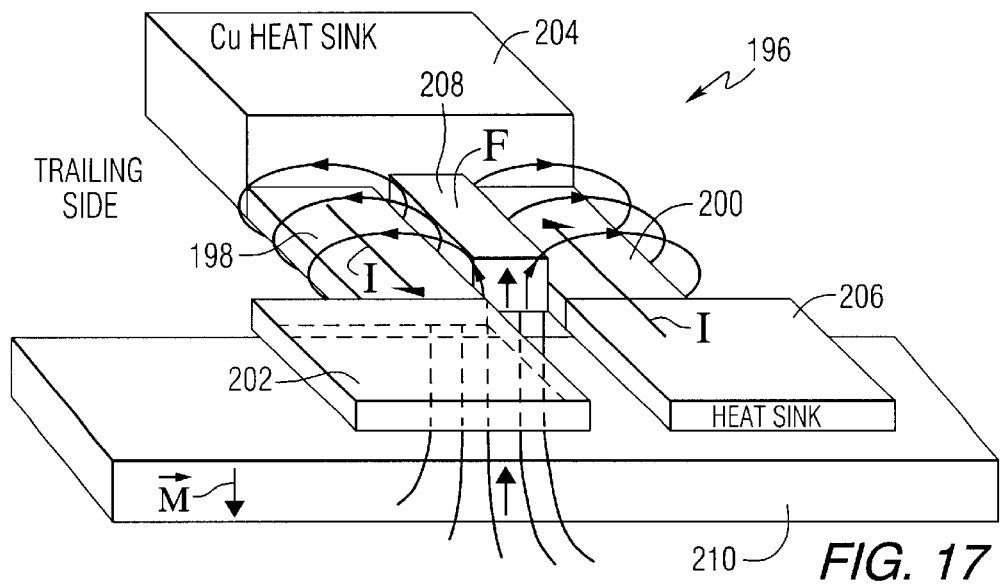
FIG. 17 is a pictorial representation of another recording head for perpendicular writing constructed in accordance with the invention.

FIG. 17 is a pictorial representation of another recording head 196 for perpendicular writing constructed in accordance with the invention. Recording head 196 includes first and second linear conductors 198 and 200, each having a generally rectangular cross-section. A first end of conductor 198 is connected to a first conducive heat sink 202, and a second end of conductor 198 is connected to a second conducive heat sink 204. A first end of conductor 200 is connected to a third conducive heat sink 206, and a second end of conductor 200 is connected to the second conducive heat sink 204. A layer of ferromagnetic material 208 is positioned between the linear conductors. Heat sinks 202 and 206 are connected to receive current supplied by an external current source, to create a magnetic field H that has sufficient strength to affect the magnetization of the magnetic recording medium 210. In FIG. 17, the conductor is oriented parallel to the surface of the recording medium.

In FIGS. 14 and 15, and 16 and 17 we present designs for longitudinal and perpendicular Ampere heads, where a soft, high $4\pi M_s$ ferromagnetic (F) material is incorporated to bolster the field from the Ampere head. The magnetic films would have dimensions comparable to the wire, which would lead to fairly large shape anisotropy of the magnetization due to large demagnetizing fields. Thus, this "soft" magnetic material would act rather magnetically hard compared to its behavior in bulk, so the fields from the Ampere head need to be large enough to magnetize the material to take advantage of the superposition of the fields from the wire and the magnetic materials. In this sense the Ampere head and the magnetic material would have comparable contributions to the write field. Of course, a magnetic material can similarly be incorporated into any of the perpendicular designs discussed herein.

Figure 18:
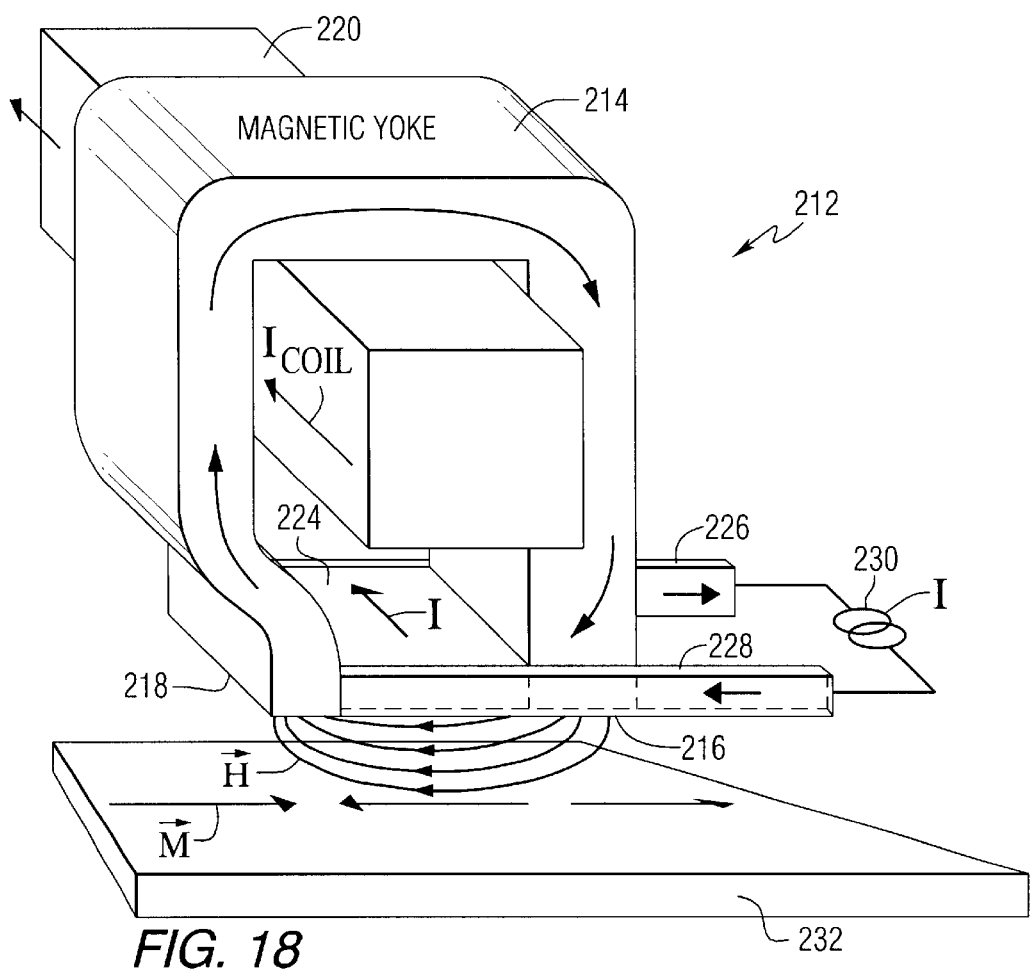
FIG. 18 is a pictorial representation of another recording head for longitudinal writing constructed in accordance with the invention.

FIG. 18 is a pictorial representation of another recording head 212 for longitudinal writing constructed in accordance with the invention. Recording head 212 includes a magnetic yoke 214 forming first and second pole tips 216 and 218. A coil 220 is mounted within the yoke such that current in the coil induces a magnetic field in the yoke and creates a magnetic field H extending between the pole tips. A linear conductor 224 having a rectangular cross-section is positioned in a void between the pole tips. A first end of the linear conductor is connected to a second conductor 226 and a second end of the linear conductor is connected to a third conductor 228. The second and third conductors are connected to an external current source 230. Magnetic flux between the pole tips induces longitudinal areas of magnetization M in the magnetic recording medium 232. The field distribution of the magnetic flux produced by current flowing in the conductor is essentially the same as the field distribution of the magnetic flux produced across the pole tips. The current density in the conductor is much larger than the current density in the coil.

Figure 19:
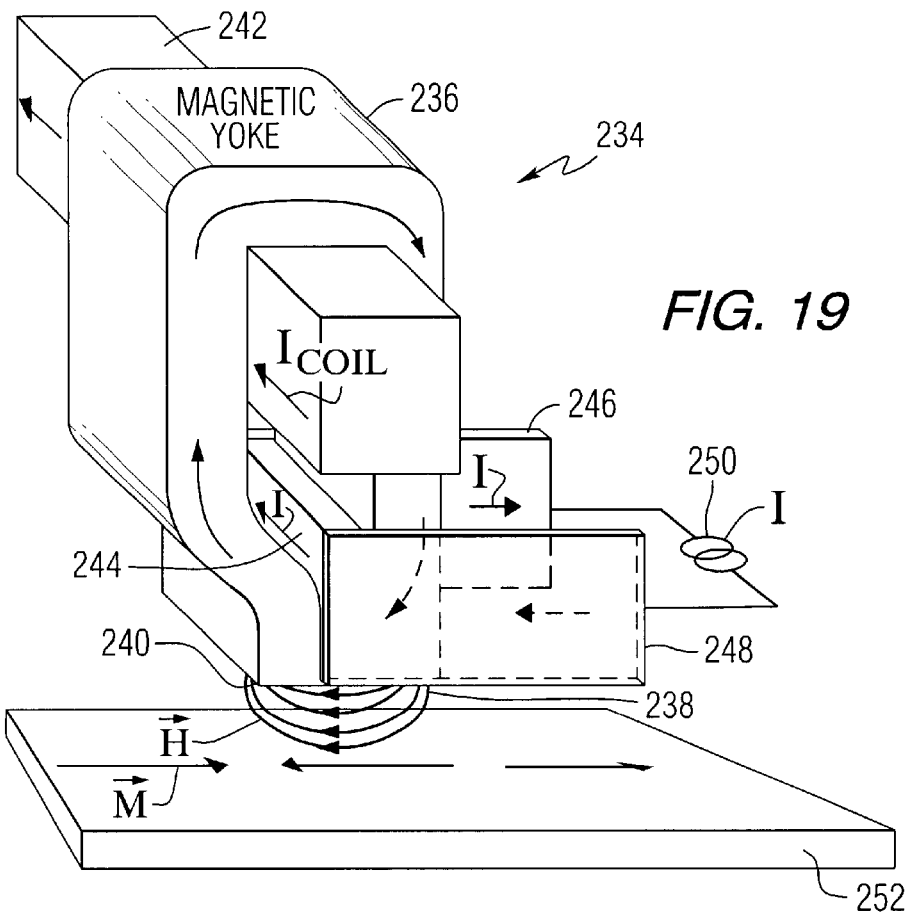
FIG. 19 is a pictorial representation of another recording head for longitudinal writing constructed in accordance with the invention.

FIG. 19 is a pictorial representation of another recording head 234 for longitudinal writing constructed in accordance with the invention. Recording head 234 includes a magnetic yoke 236 forming first and second pole tips 238 and 240. A coil 242 is mounted within the yoke such that current in the coil induces a magnetic field in the yoke and creates a magnetic field H extending between the pole tips. A linear conductor 244 having a rectangular cross-section is positioned between the pole tips. A first end of the linear conductor is connected to a second conductor 246 and a second end of the linear conductor is connected to a third conductor 248. The second and third conductors are connected to an external current source 250. Magnetic flux between the pole tips induces longitudinal areas for magnetization M in the magnetic recording medium 252. As in the write head of FIG. 18, the field distribution of the magnetic flux produced by current flowing in the conductor is essentially the same as the field distribution of the magnetic flux produced across the pole tips. The current density in the conductor is much larger than the current density in the coil.

Traditionally, writing to a harder medium has been achieved by increasing the saturation magnetization, or $4\pi M_s$ value, of the magnetic material of the inductive write head, thus bolstering the magnetic field applied to the medium. Though there has been some success in materials research efforts to increase $M_s$ of the pole materials, the rate of increase is not significant enough to sustain the annual growth rate of bit areal densities in disc storage. We present a method whereby an Ampere head is merged with an inductive writer to bolster the local field magnitude beyond what is achievable by engineering new materials. Two designs for such a merged head for longitudinal writing are demonstrated in FIGS. 18 and 19, where the thin film wire is placed in the gap of an inductive longitudinal writer such that the wire is electrically isolated from the magnetic yoke.

When the current in the wire and the coil are applied simultaneously, as shown, the fields from the inductive writer and the Ampere head add together to increase the flux density locally. For example, if an inductive writer with saturation magnetization of 2.4 T has a wire spanning the write gap of width w=100 nm, and thickness t=30 nm that carries a current I=100 mA ($J=3.3\times10^9$ A/cm$^2$), we have H≅0.63 T of additional field for a total field of about 3 T.

Figure 20:
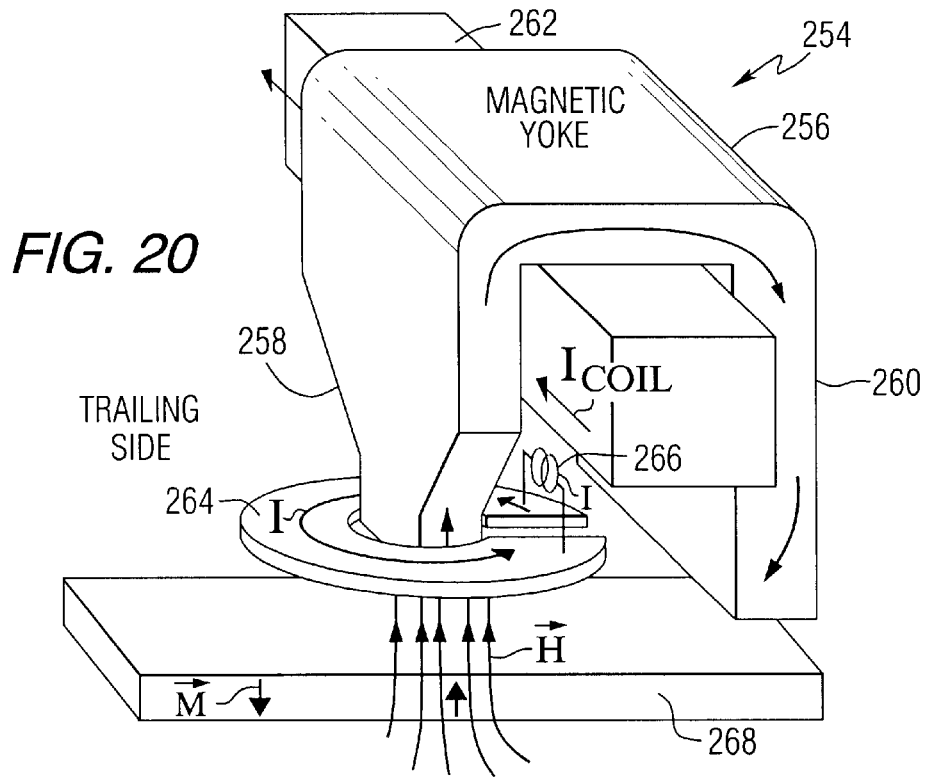
FIG. 20 is a pictorial representation of another recording head for perpendicular writing constructed in accordance with the invention.

FIG. 20 is a pictorial representation of a recording head 254 for perpendicular writing constructed in accordance with the invention. Head 254 includes a yoke 256 having a write pole 258 and a return pole 260. A coil 262 is positioned to induce magnetic flux in the yoke. A conductor 264 having a rectangular cross-section is formed into a loop around the write pole, and connected to an external current source 266. The combination of current in coil 262 and conductor 264 creates a magnetic field H that affects the magnetization of the magnetic recording medium 268.

Figure 21:
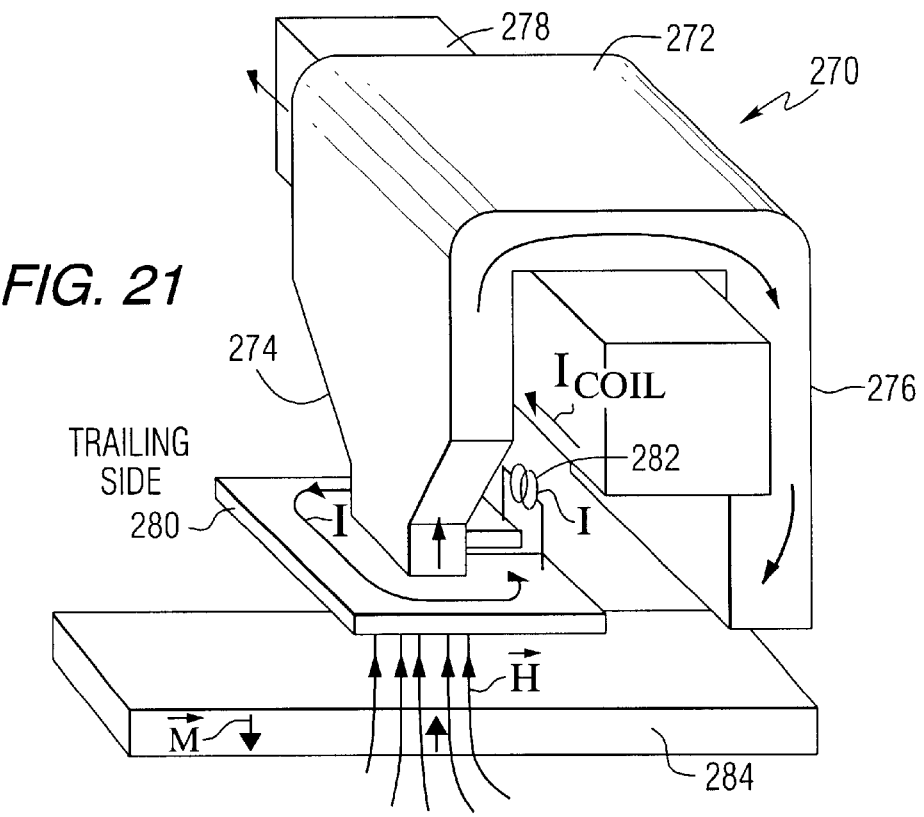
FIG. 21 is a pictorial representation of another recording head for perpendicular writing constructed in accordance with the invention.

FIG. 21 is a pictorial representation of another recording head 270 for perpendicular writing constructed in accordance with the invention. Head 270 includes a yoke 272 having a write pole 274 and a return pole 276. A coil 278 is positioned to induce magnetic flux in the yoke. A conductor 280 having a rectangular cross-section is formed into a loop around the write pole, and connected to an external current source 282. The combination of current in coil 278 and conductor 280 creates a magnetic field H that affects the magnetization of the magnetic recording medium 284.

Figure 22:
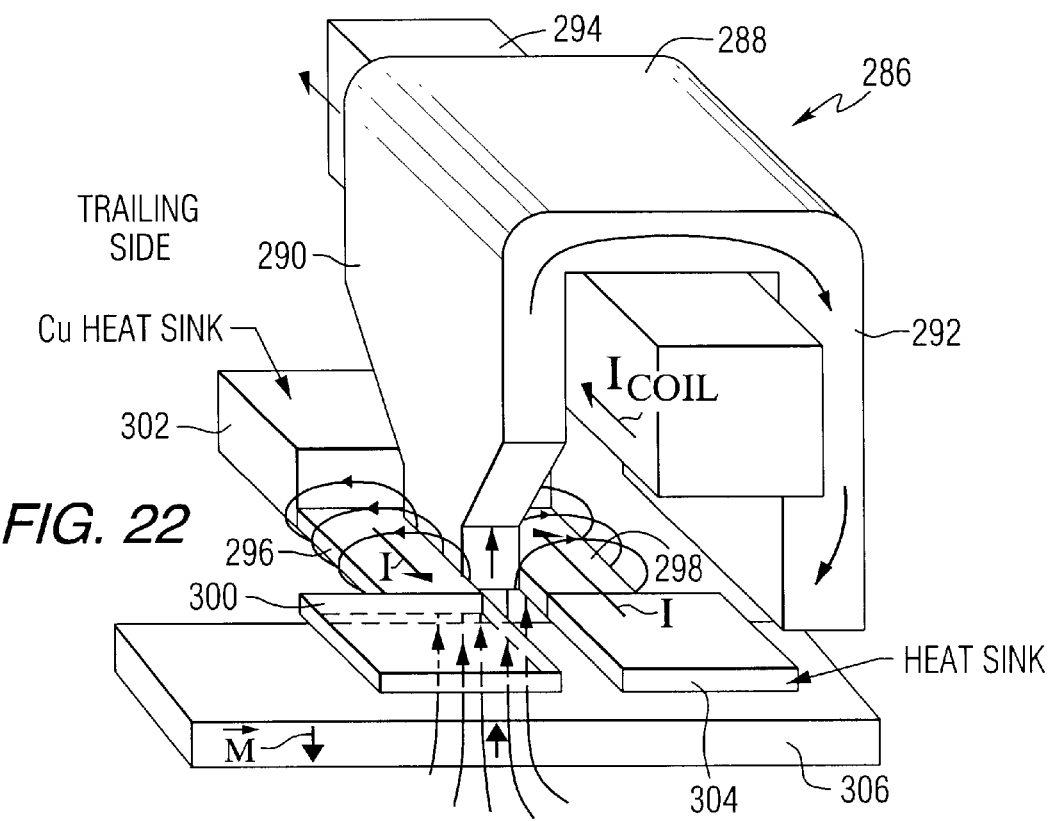
FIG. 22 is a pictorial representation of another recording head for perpendicular writing constructed in accordance with the invention.

FIG. 22 is a pictorial representation of another recording head 286 for perpendicular writing constructed in accordance with the invention. Head 286 includes a yoke 288 having a write pole 290 and a return pole 292. A coil 294 is positioned to induce magnetic flux in the yoke. A first linear conductor 296 having a rectangular cross-section is positioned adjacent to one side of the write pole. A second linear conductor 298 having a rectangular cross-section is positioned adjacent to an opposite side of the write pole. A first end of the first linear conductor is connected to a first heat sink 300. A second end of the first linear conductor is connected to a second heat sink 302. A first end of the second linear conductor is connected to a third heat sink 304. A second end of the second linear conductor is connected to the second heat sink 302. Heat sinks 300 and 304 are connected to an external current source. The combination of current in coil 294 and two linear conductors 296 and 298, creates a magnetic field H that affects the magnetization of the magnetic recording medium 306.

Figure 23:
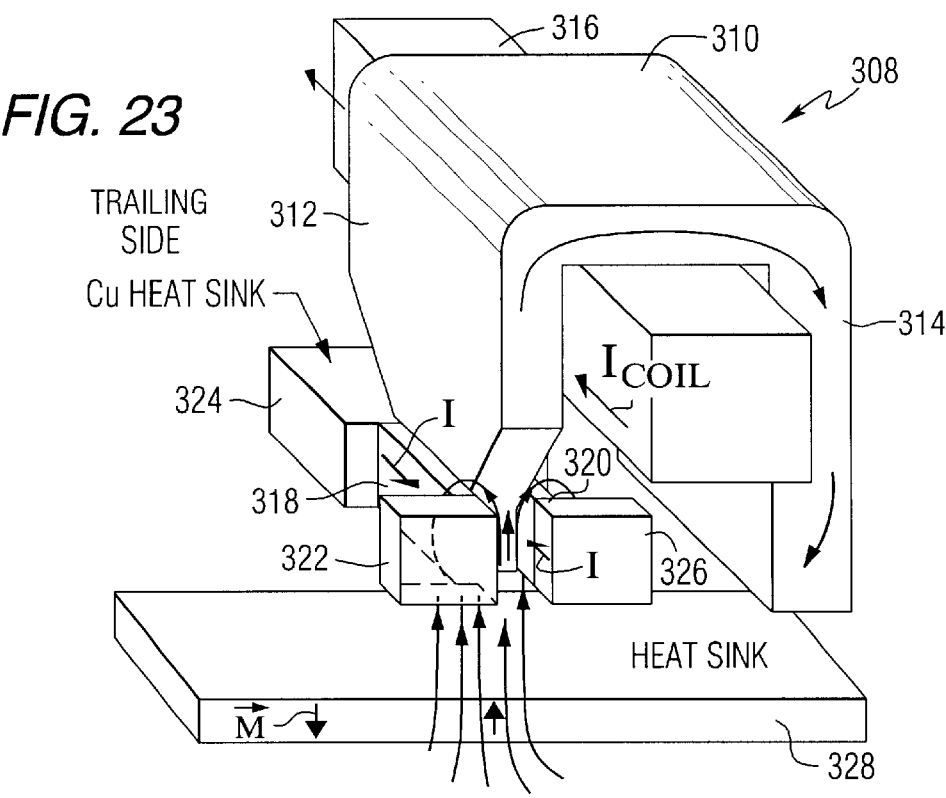
FIG. 23 is a pictorial representation of another recording head for perpendicular writing constructed in accordance with the invention.

FIG. 23 is a pictorial representation of another recording head 308 for perpendicular writing constructed in accordance with the invention. Head 308 includes a yoke 310 having a write pole 312 and a return pole 314. A coil 316 is positioned to induce magnetic flux in the yoke. A first linear conductor 318 having a rectangular cross-section is positioned adjacent to one side of the write pole. A second linear conductor 320 having a rectangular cross-section is positioned adjacent to an opposite side of the write pole. A first end of the first linear conductor is connected to a first heat sink 322. A second end of the first linear conductor is connected to a second heat sink 324. A first end of the second linear conductor is connected to a third heat sink 326. A second end of the second linear conductor is connected to the second heat sink 324. Heat sinks 324 and 326 are connected to an external current source. The combination of current in coil 316 and two linear conductors 318 and 320, creates a magnetic field H that affects the magnetization of the magnetic recording medium 328.

In FIGS. 20–23 we depict "single-pole" perpendicular inductive writers with a merged Ampere head. In this case the wire would loop around the single pole to produce a perpendicular field that locally adds to the perpendicular field emanating from the pole face, bolstering the achievable field magnitude in a similar way to that discussed above for its longitudinal analog.

Figure 24:
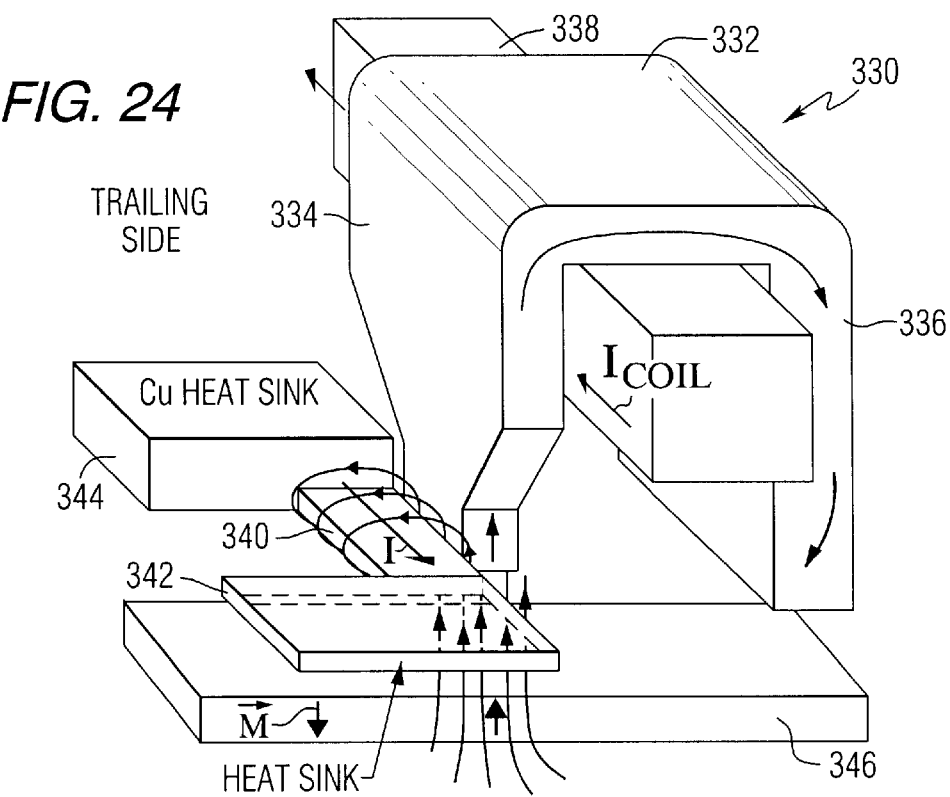
FIG. 24 is a pictorial representation of another recording head for perpendicular writing constructed in accordance with the invention.

FIG. 24 is a pictorial representation of another recording head 330 for perpendicular writing constructed in accordance with the invention. Head 330 includes a yoke 332 having a write pole 334 and a return pole 336. A coil 338 is positioned to induce magnetic flux in the yoke. A first linear conductor 340 having a rectangular cross-section is positioned adjacent to one side of the write pole. A first end of the first linear conductor is connected to a first heat sink 342. A second end of the first linear conductor is connected to a second heat sink 344. The combination of current in coil 338 and the linear conductor 340, creates a magnetic field H that affects the magnetization of the magnetic recording medium 346.

FIGS. 21, 22, 23, and 24 are variations on the design of FIG. 20 that are simpler to manufacture, and with FIGS. 22, 23 and 24 we demonstrate a method for incorporating heat sinks for high current densities. The design of FIG. 24 represents the simplest realization of the merged head. The working principle is based on the fact that a single pole inductive head writes a magnetic transition using the perpendicular field at its trailing edge, since this edge is the last part of the pole the media "sees". Thus, it is enough to bolster the field locally at the trailing edge, as opposed to over the entire pole area at the ABS as the designs of FIGS. 21, 22, and 23 do, though these have the advantage of generating larger fields for a given current. As a result, we can incorporate a wire adjacent to the trailing edge, as depicted in FIG. 24, such that the perpendicular field generated at the wire's edge closest to the trailing edge of the pole bolsters the write field. It is also necessary to maintain the large field gradient at the trailing edge, and superposing the sharp perpendicular field profile for a wire, demonstrated in FIG. 4, on that of the pole should satisfy this. In fact, this is true of all the designs mentioned above.

The large field gradients of the wire and pole make it imperative for them to be as close as possible without electrical contact, otherwise the bolstering effect of superposing their fields will diminish due to spacing loss. Electrical isolation is not explicitly shown in the schematics of FIGS. 14–24, but it may be appropriate to have an insulating layer between them of a thickness very small compared to the wire width. Since the wafer is built up orthogonally to the ABS, the insulating layer needed to separate the wires from the leading and trailing edges of the poles (both longitudinal and perpendicular designs) is deposited parallel to the wafer surface and, thus, can be deposited very uniformly and adequately at about 1 nm thickness, resulting in minimal field spacing loss for pole and wire dimensions of 50 nm, or more. Also, the resistivity of a pole material is typically (or can be engineered) from one to two orders of magnitude larger than Cu, for example, (and with comparable dimensions this translates to a much larger pole resistance) so electrical contact of the wire and pole would probably not result in any significant leakage of current out of the wire. Thus, the wire and poles can be placed arbitrarily close together, virtually eliminating any field spacing loss.

Another approach to recording on higher coercivity media is to locally and temporarily raise the temperature of the magnetic material, thus lowering its temperature-dependent coercivity, at which point a magnetic field is applied to write a transition. One method for heating is to stimulate the media with high energy-density electromagnetic radiation. A technique for doing this involves using an optical laser to stimulate a metal "antenna" which has a small aperture for coupling out the stimulated high energy density electromagnetic radiation in the near field. The near field radiation spreads over a length scale of the order of the aperture dimension, locally heating the medium and lowering the coercivity during the writing process. The optical antenna would have to be merged with an inductive writer so that the radiation field and the write field coincide spatially and temporally. This technique is referred to as Optically Assisted Magnetic Recording (OAMR). A working design for such a head has not yet been demonstrated and the fabrication of such a device would be difficult.

Figure 25:
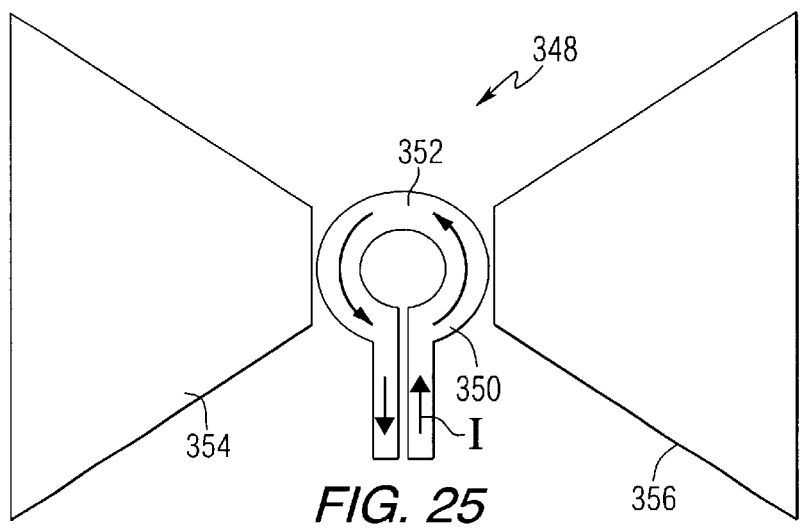
FIG. 25 is a pictorial representation of another recording head for perpendicular writing including an OAMR (Optically Assisted Magnetic Recording) bow-tie structure constructed in accordance with the invention.

FIG. 25 is a pictorial representation of another recording head 348 for perpendicular writing including an OAMR bow-tie structure constructed in accordance with the invention. Head 348 includes a loop 350 of a conductor 352 having a rectangular cross-section and being positioned between two bow tie segments 354 and 356. Current in the loop creates a magnetic field that is used to write to an adjacent magnetic recording medium. The bow tie segments form an antenna that is used to increase the temperature of the magnetic recording medium in the area to be written.

Figure 26:
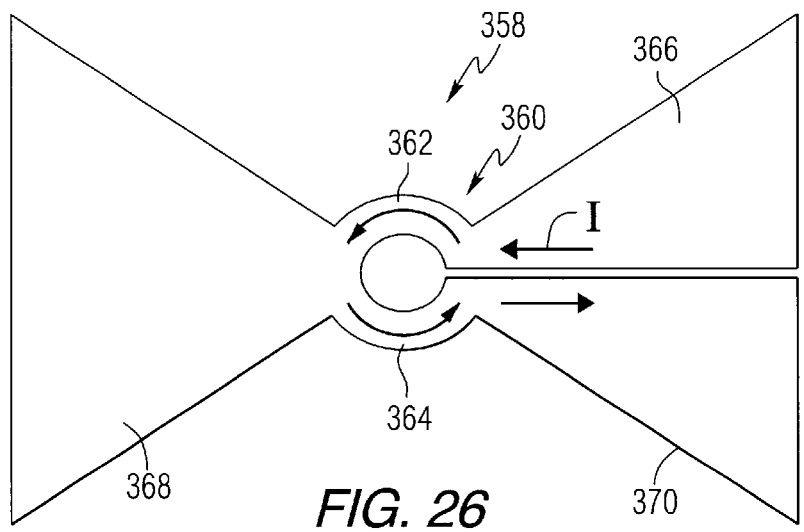
FIG. 26 is a pictorial representation of another recording head for perpendicular writing including an OAMR bow-tie structure constructed in accordance with the invention.

FIG. 26 is a pictorial representation of another recording head 358 for perpendicular writing including an OAMR bow-tie structure constructed in accordance with the invention. Head 358 includes a loop 360 including a pair of conductors 362 and 364 that are connected to two bow tie segments 366, 368 and 370. Segments 366 and 370 would be connected to an external current source and current in the loop creates a magnetic field that is used to write to an adjacent magnetic recording medium.

Figure 27:
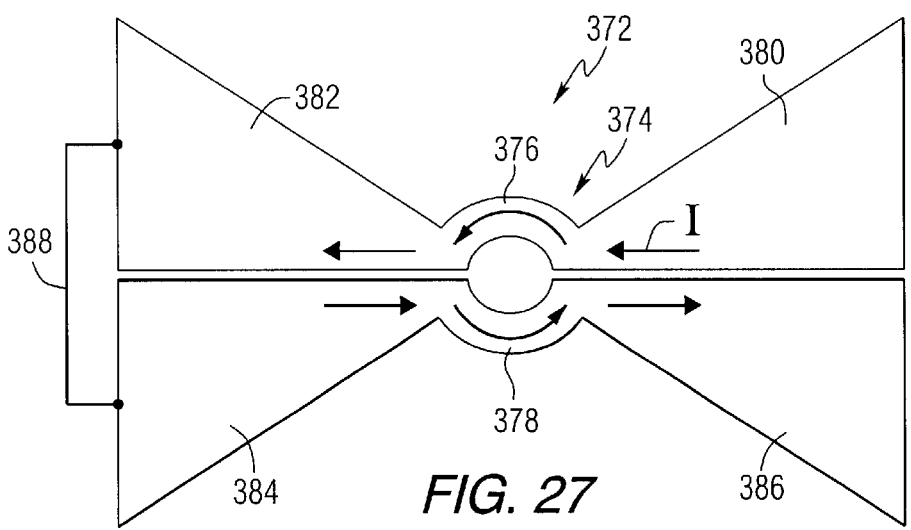
FIG. 27 is a pictorial representation of another recording head for perpendicular writing including an OAMR bow-tie structure constructed in accordance with the invention.

FIG. 27 is a pictorial representation of another recording head 372 for perpendicular writing including an OAMR bow-tie structure constructed in accordance with the invention. Head 372 includes a loop 374 including a pair of conductors 376 and 378 that are connected to two bow tie segments 380, 382, 384 and 386. Segments 382 and 384 are electrically connected by conductor 388. Segments 380 and 386 would be connected to an external current source and current in the loop creates a magnetic field that is used to write to an adjacent magnetic recording medium.

The design of FIG. 25 merges a perpendicular Ampere head with an optical antenna, in particular, with what is referred to as a bow tie antenna. The laser stimulated radiation field emanates from the region between the two sections of the bow tie where the Ampere wire is placed, and the radiation field and magnetic field are then coincident on the medium. The idea is to simply replace the inductive write head of the OAMR design discussed above with an Ampere head. The merged design is not limited to the wire loop of FIG. 25, or to perpendicular recording for that matter, but can more generally incorporate all the Ampere head designs discussed herein. Some of the benefits of using the Ampere head to generate the field have been discussed above, and an additional benefit may be the greater flexibility and ease of fabricating the merged design. For example, Au and Ag are good material choices for both the antenna and the Ampere head, so the wire of the Ampere head can be integrated with the optical antenna, and one such method for accomplishing this with a bow-tie antenna is depicted in FIG. 26. In FIG. 27 we depict a merged design with a fully split bow tie which should have improved heat delivery efficiency over that of FIG. 25, at the expense of some magnetic field magnitude. While a bow tie antenna structure is illustrated in FIGS. 25–27, it should be understood that other alternative antenna structures could also be utilized in the recording heads of this invention.

Figure 28:
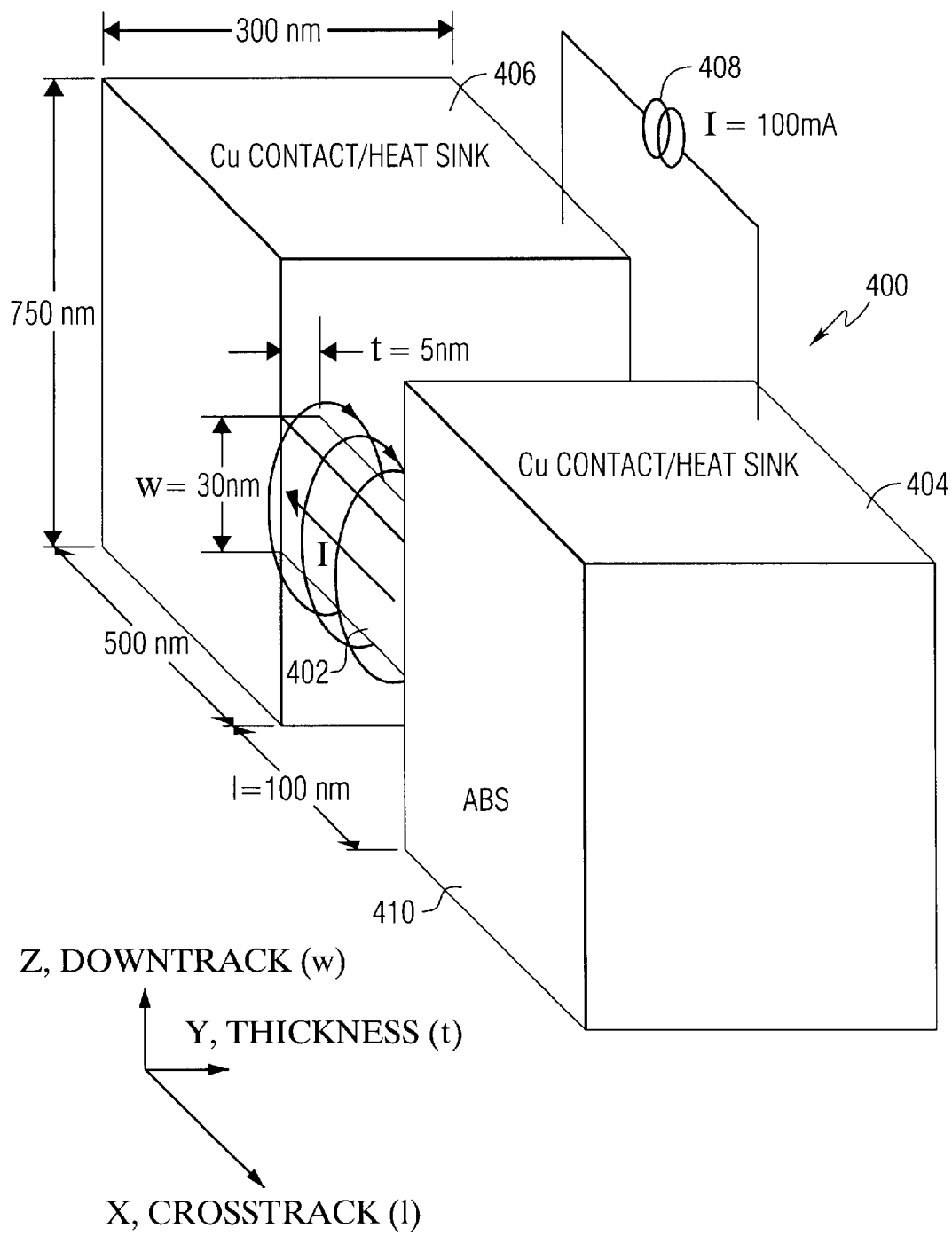
FIG. 28 is a pictorial representation of recording head that can be used to further explain the operation of the invention.

A more detailed analysis of a current carrying wire further demonstrates the desirable characteristics of the invention as a local field source for magnetic recording. FIG. 28 is a pictorial representation of recording head that can be used to further explain the operation of the invention. The recording head 400 of FIG. 28 includes a thin film wire 402 electrically connected to, and positioned between, two contacts 404 and 406 that also serve as heat sinks. A current source 408 is used to supply current to the wire and the contacts. The wire is positioned adjacent to the air bearing surface 410 of the head. The structure of FIG. 28 can be readily fabricated with dimensions appropriate for high density recording.

Finite element modeling (FEM) techniques were used to calculate the local magnetic field profile for the particular device geometry depicted schematically in FIG. 28. In the modeled example, a Cu wire 402 having a crosstrack direction length 1 of 100 nm, a downtrack direction width w of 30 nm, and a thickness t of 5 nm, is contacted at each end of the wire by Cu contacts 404, 406 of dimension 500 nm along the x direction, 300 nm along the y direction, and 750 nm along the z direction. The wire is positioned flush with the ABS surface 410 and is centered along the z direction. A current of 100 mA is driven through the wire, resulting in a current density in the wire of about $6 \times 10^{10}$ A/cm$^2$. This is just above current densities that have been reported in the literature, where for example, a DC biased current density of $1.8 \times 10^{10}$ A/cm$^2$ was driven continuously (for two weeks) through a 10 nm diameter carbon nanotube at high temperature (250° C.).

The large difference in cross sectional area between the wire (30 nm×5 nm) and the contacts (750 nm×300 nm, 500 nm×300 nm, or 500 nm×750 nm depending on current direction) leads to a large difference in their respective current densities, and thus, the magnetic fields they generate. This results in a large field generated locally by the wire with a steep fall off in the magnitude of this field beyond the wire boundary.

Figure 29:
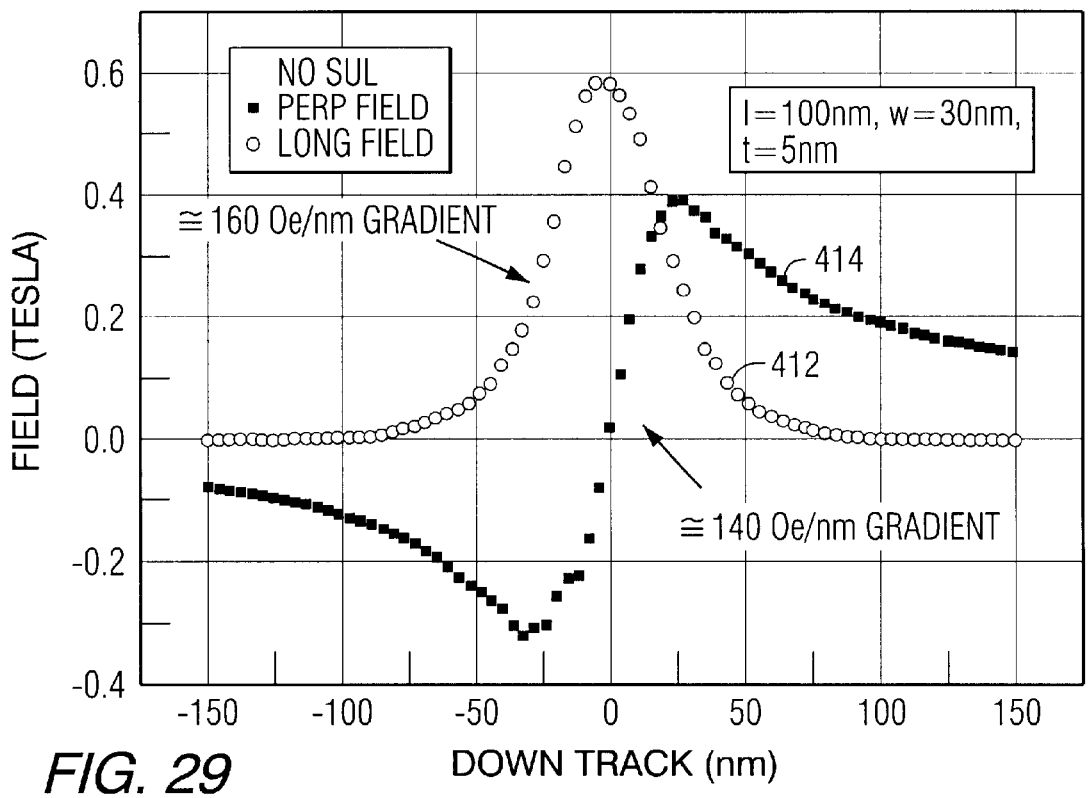
FIG. 29 is a graph of a magnetic field profile of the current-carrying thin film wire of the structure of FIG. 28.

FIG. 29 is a graph of a magnetic field profile of the current-carrying thin film wire of the structure of FIG. 28. FIG. 29 shows the downtrack field profile of the longitudinal field 412 and the perpendicular field 414 as measured in the middle of the length of the wire and a distance of 20 nm (along the y direction) away from the ABS and the wire surface at the bottom of an assumed media having no soft magnetic under layer. The peak magnitude for the longitudinal component of the magnetic field can be seen to be about 6000 Oe with a peak field gradient (slope) of about 160 Oe/nm, while that of the perpendicular field is about 4000 Oe and 140 Oe/nm, respectively.

Figure 30:
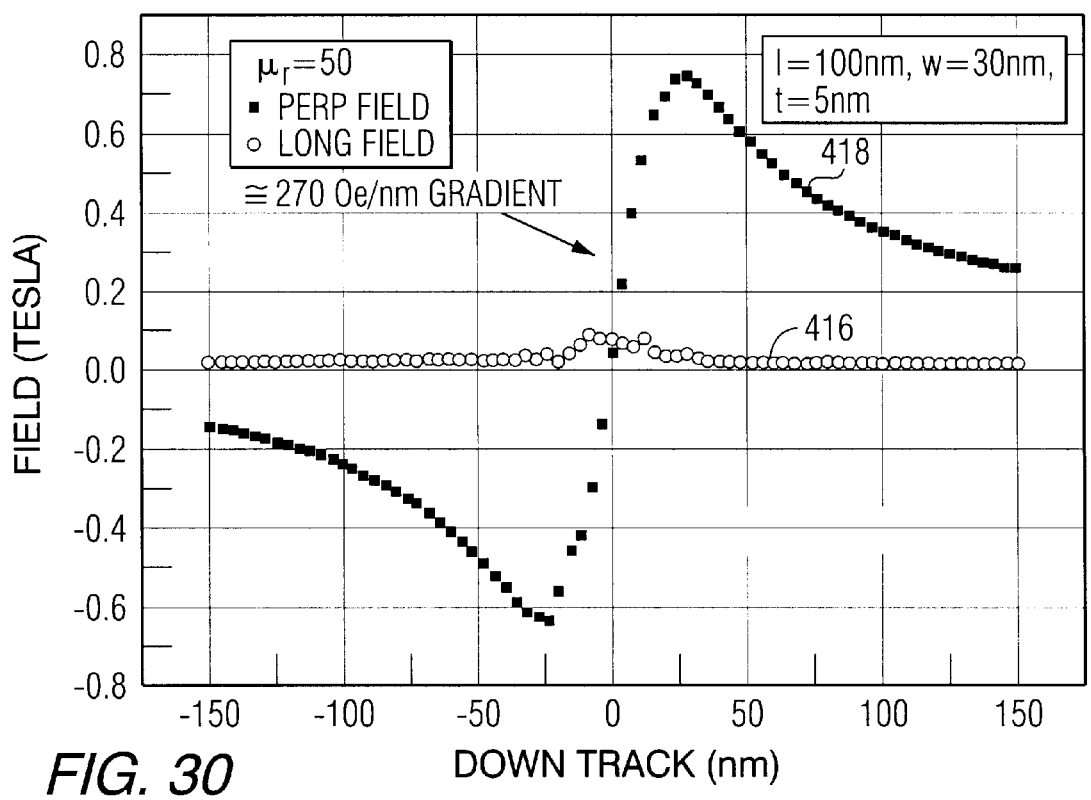
FIG. 30 is another graph of a magnetic field profile of a current-carrying thin film wire of the structure of FIG. 28.

FIG. 30 is another graph of a magnetic field profile of a current-carrying thin film wire of the structure of FIG. 28. FIG. 30 shows the downtrack field profile of the longitudinal field 416 and the perpendicular field 418 when a soft magnetic under layer (SUL) is placed under the assumed recording layer of the media, 20 nm below the ABS, having a thickness of 35 nm, and a normalized magnetic permeability of $\mu$=50. Thus, the data of FIG. 30 are measured at the top of the SUL, or, equivalently, at the bottom of the recording layer. A SUL is appropriate for perpendicular magnetic recording, as it is clear from the data that the perpendicular field is enhanced while the longitudinal component is suppressed. Now there is a peak perpendicular field of about 7500 Oe and a peak downtrack field gradient of about 270 Oe/nm.

Figure 31:
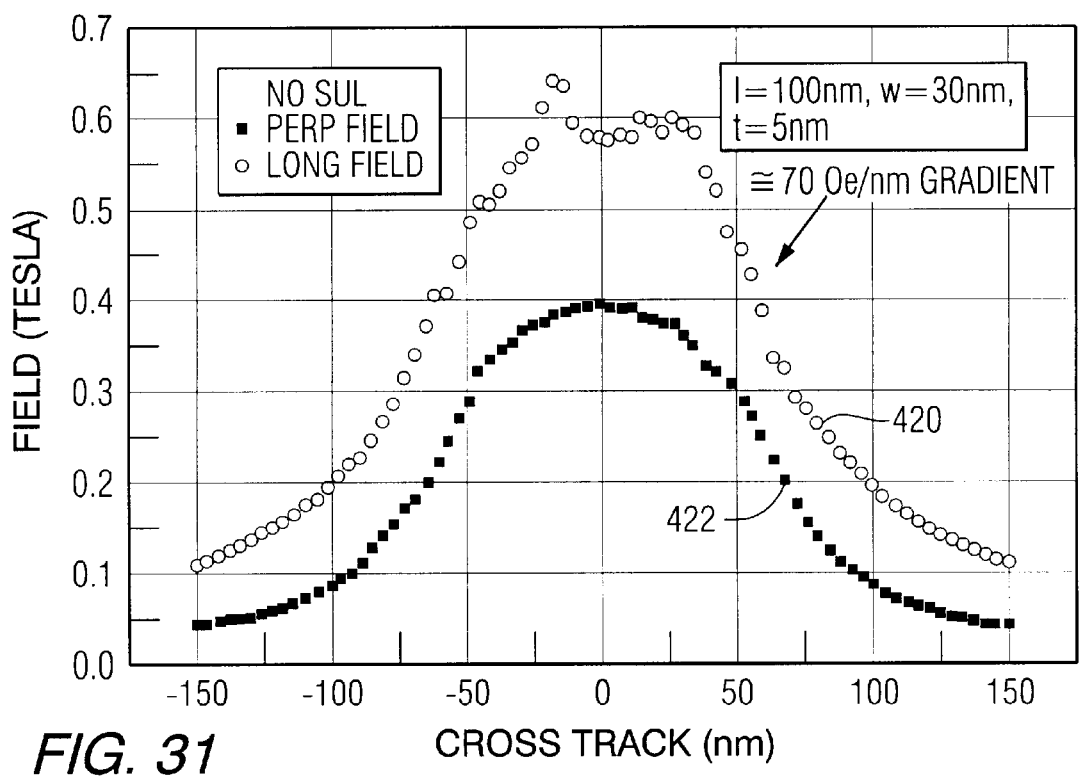
FIG. 31 is a graph of a magnetic field profile of the current-carrying thin film wire of the structure of FIG. 28.

FIG. 31 is another graph of a magnetic field profile of a current-carrying thin film wire of the structure of FIG. 28. FIG. 31 shows the crosstrack field profiles of the longitudinal field 420 and the perpendicular field 422 measured 20 nm from the ABS, at the bottom of an assumed media having no soft magnetic under layer and at the downtrack position where the field magnitude is a maximum (refer to FIGS. 29 and 30).

Figure 32:
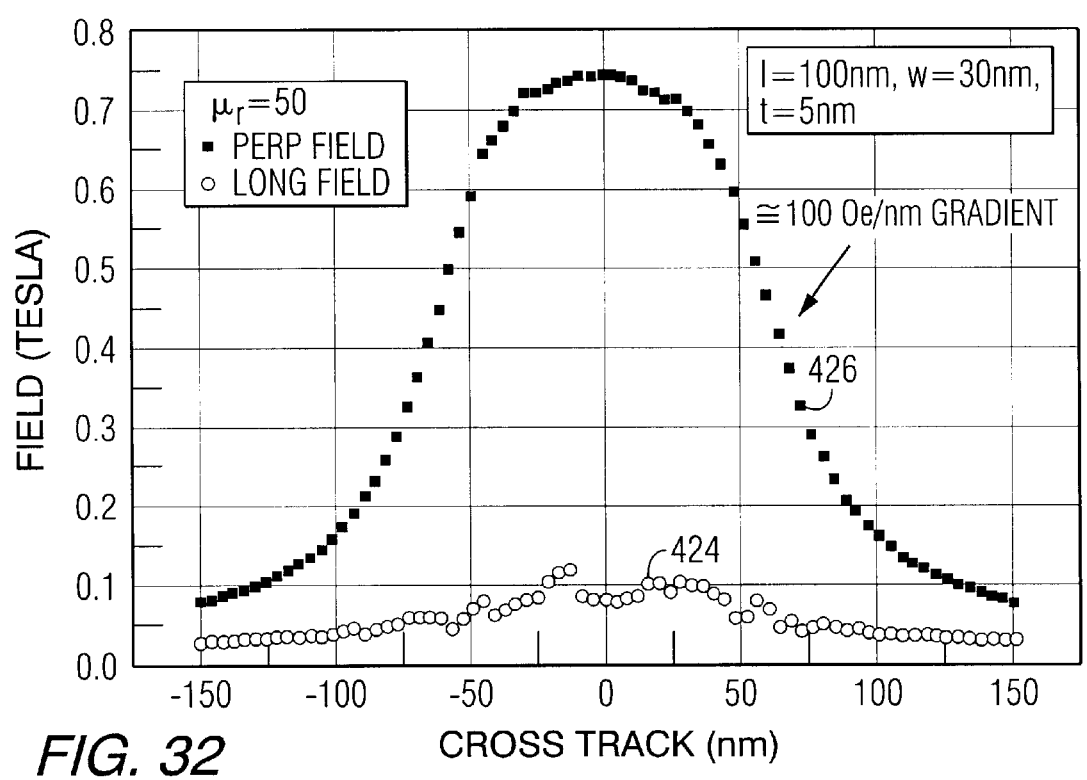
FIG. 32 is another graph of a magnetic field profile of a current-carrying thin film wire of the structure of FIG. 28.

FIG. 32 shows the crosstrack field profiles of the longitudinal field 424 and the perpendicular field 426 when a soft magnetic under layer (SUL) is placed under the assumed recording layer of the media, 20 nm below the ABS, having a thickness of 35 nm, and a normalized magnetic permeability of $\mu$=50. Field gradients as large as 100 Oe/nm are demonstrated along the crosstrack direction, in the particular example of the perpendicular field component with a SUL.

The invention imposes a large differential in the current density between the wire and the contacts, which results in substantial crosstrack field gradients, necessary for high-density magnetic recording. For example, the current density in the wire was assumed to be more than 1000 times the average current density in the contacts in the modeled structure discussed above. Also, the large volume contacts, with relatively low current density, act as high thermal conductance heat sinks where heat generated in the wire can be dumped. In addition, the proposed wire lengths (1≦100 nm) are comparable or less than an electron mean free path in a typical metal (~100 nm), which will help to minimize Ohmic heating (due to itinerant electron scattering events) in the wire. These field profiles, and their corresponding magnitudes and gradients, are large enough to write at areal densities approaching 100 Gbit/in$^2$, and, of course, this can be extended to higher areal densities by using smaller wire dimensions, and/or by using one of the other device geometries discussed herein that result in larger field magnitudes for the same applied current. The modeling results demonstrate the viability of the invention as a write head for high-density magnetic recording.

Patterned media, where the medium is lithographically, or otherwise, defined in an ordered array of islands of magnetic material with dimensions and spacing appropriate for a desired bit-areal density, would be an ideal medium for the use of the Ampere head because the bit shape is largely defined by the patterning of the media as opposed to the head. Thus, the magnetic field profile needed to create a bit could be relaxed such that its spatial distribution need only be well enough defined that it magnetizes one island without magnetizing neighboring islands. This would be particularly relevant when the field pulse duration is so short that the footprint method of writing is used, and the island of patterned magnetic media would be magnetized by the nearly instantaneous application of a magnetic field uniformly over the island.

There are numerous advantages to using an Ampere head. The head can be fabricated with conventional materials, fabrication processes, and lithographic technology. In particular, the thin-film wire materials can be a simple single element Au, Ag or Cu, or the like. The wire geometries are of rather low complexity and should be straightforward to fabricate using known processes. The dynamic response of the head should be extremely fast compared to magnetic materials, making higher data rates more realizable. In fact, the high-speed capability of an Ampere head could be used to drive the dynamics of the recording medium, allowing for the advance of data rates well beyond a GHz. There is the potential for generating higher magnetic fields than what is achievable by any other method. The magnetic fields generated by a current carrying wire increase for a fixed current as the dimensions of the wire shrink, thus an Ampere head has inverse scalability. The low complexity of the wire structures makes them suitable for merging with various forms of the present technology to advance these techniques beyond their present limits. Finally, for many of the reasons just mentioned, an Ampere head should be relatively inexpensive to manufacture, making it a viable magnetic recording head for the future. Thus, as the size scale of magnetic recording heads continue to shrink, and within the constraints of the available technology, a current carrying wire becomes a viable way to generate and modulate the local magnetic fields needed to write magnetic transitions in a recording medium at areal densities and data rates that advance magnetic recording well into the future.

This invention provides a method for generating local magnetic fields from a current carrying wire in a magnetic recording head. The wire can be geometrically defined to produce either longitudinal or perpendicular magnetic fields with respect to the plane of a magnetic recording medium. The critical dimensions of the wire, as well as its geometry, dictate the size scale of a magnetic bit that can be written with this method, and the critical dimensions are limited only by standard lithographic technology. With appropriately high current densities and signal frequencies applied to a lithographically defined wire, local magnetic fields can be generated with enough flux density and modulated at high enough rates, respectively, to store information in the recording media at areal densities and data rates that advance magnetic recording well beyond the present technology.

While particular embodiments of the invention have been described herein for the purpose of illustrating the invention and not for purpose of limiting the same, it will be appreciated by those of ordinary skill in the art that numerous variations of the details, materials, and arrangements of parts may be made without departing from the scope of the invention as defined in the appended claims.

What is claimed is:

1. A method of recording information bits in a magnetic storage medium, the method comprising:

positioning a first conductor adjacent to a magnetic recording medium, the conductor having a width and a length, wherein a distance between the first conductor and the magnetic recording medium is less than or equal to the width and the length; and passing a first current through the conductor of sufficient magnitude to produce a magnetic field in the magnetic medium greater than one Tesla and having a magnetic field gradient in a cross track direction and a down track direction greater than 100 Oe/nm over a bit dimension.

2. The method of claim 1, wherein the width and the length are approximately equal to a bit length and a track width in the magnetic recording medium.

3. The method of claim 1, wherein the first current is less than 100 mA.

4. The method of claim 1, wherein the density of the current in the first conductor is greater than $10^9$ ampere/cm$^2$.

5. The method of claim 1, wherein the length, width and thickness of the first conductor are each less than 100 nm.

6. The method of claim 1, further comprising:

positioning a layer of ferromagnetic material adjacent to the first conductor; and using the layer of ferromagnetic material to augment the magnetic field.

7. The method of claim 1, further comprising:

positioning the first conductor between a write pole and a return pole of a magnetic yoke;

passing a second current through a coil to produce magnetic flux in the yoke; and using the magnetic flux in the yoke to augment the magnetic field.

8. The method of claim 1, further comprising:

positioning an antenna adjacent to, or integral with, the first conductor; and using the antenna to heat the magnetic medium.

9. The method of claim 1, further comprising:

positioning a second conductor adjacent to the magnetic recording medium and parallel to the first conductor, the second conductor having a width and a thickness, wherein the width is greater than the thickness; and passing a second current through the second conductor to augment the magnetic field.

10. The method of claim 1, wherein the first current comprises a current pulse having a duration of less than a predetermined clock cycle time.

11. The method of claim 1, wherein the first current comprises a plurality of current pulses within a time period of the duration of a predetermined clock cycle time.

12. The method of claim 1, wherein the first conductor has a thickness that is less than or equal to the distance between the first conductor and the magnetic recording medium.

13. The method of claim 1, wherein the step of passing a first current through the conductor comprises:

passing the first current through a first contact connected to a first end of the first conductor; and passing the first current through a second contact connected to a second end of the first conductor;

wherein the average current density in the first conductor is greater than 1000 times the average current density in each of the first and second contacts.

14. A recording head for use with a magnetic storage medium, comprising:

a first conductor having a width and a length;

means for positioning the first conductor adjacent to a magnetic recording medium, wherein a distance between the first conductor and the magnetic recording medium is less than or equal to the width and the length; and means for passing a first current through the first conductor of sufficient magnitude to produce a magnetic field in the magnetic medium greater than one Tesla and a magnetic field gradient in a cross track direction and a down track direction greater than 100 Oe/nm over a bit dimension.

15. The recording head of claim 14, further comprising:

a layer of ferromagnetic material adjacent to the first conductor.

16. The recording head of claim 14, further comprising:

a magnetic yoke having a write pole and a return pole, wherein the first conductor is positioned between the write pole and the return pole; and a coil for producing magnetic flux in the yoke.

17. The recording head of claim 14, further comprising:

an antenna adjacent to the first conductor.

18. The recording head of claim 14, wherein the means for positioning the first conductor adjacent to a magnetic recording medium, further positions the first conductor such that the distance between the first conductor and the magnetic recording medium is greater than or equal to the thickness of the first conductor.

19. The recording head of claim 14, wherein means for passing a first current through the first conductor comprises:

a first contact connected to a first end of the first conductor; and a second contact connected to a second end of the first conductor;

wherein the cross-sectional area of each of the first and second contacts is greater than 1000 times the cross-sectional area of the first conductor.

20. A magnetic disc drive storage system, comprising:

a housing;

means for supporting a magnetic storage medium positioned in the housing; and means for positioning a recording head adjacent to said rotatable magnetic storage medium, the recording head including a first conductor having a width and a length, wherein a distance between the first conductor and the magnetic recording medium is less than or equal to the width and the length, and means for passing a first current through the first conductor of sufficient magnitude to produce a magnetic field in the magnetic medium greater than one Tesla and a magnetic field gradient in a cross track direction and a down track direction greater than 100 Oe/nm over a bit dimension.

21. The magnetic disc drive storage system of claim 20, wherein the recording head further comprises:

a layer of ferromagnetic material adjacent to the first conductor.

22. The magnetic disc drive storage system of claim 20, wherein the recording head further comprises:

a magnetic yoke having a write pole and a return pole, wherein the first conductor is positioned between the write pole and the return pole; and a coil for producing magnetic flux in the yoke.

23. The magnetic disc drive storage system of claim 20, wherein the recording head further comprises:

an antenna adjacent to the first conductor.

24. The magnetic disc drive storage system of claim 20, wherein the recording head further comprises:

a second conductor positioned parallel to the first conductor.

25. The magnetic disc drive storage system of claim 20, wherein the means for positioning the recording head adjacent to said rotatable magnetic storage medium, further positions the first conductor such that the distance between the first conductor and the magnetic storage medium is greater than or equal to the thickness of the first conductor.

26. The magnetic disc drive storage system of claim 20, wherein means for passing a first current through the first conductor comprises:

a first contact connected to a first end of the first conductor; and a second contact connected to a second end of the first conductor;

wherein the cross-sectional area of each of the first and second contacts is greater than 1000 times the cross-sectional area of the first conductor.

* * * * *

UNITED STATES PATENT AND TRADEMARK OFFICE
CERTIFICATE OF CORRECTION

PATENT NO. : 6,665,136 B2
DATED : December 16, 2003
INVENTOR(S) : Thomas W. Clinton, Michael Allen Seigler and Robert Earl Rottmayer It is certified that error appears in the above-identified patent and that said Letters Patent is hereby corrected as shown below:

Title page,
Item [56], References Cited, OTHER PUBLICATIONS, "J. A. Katine et al." reference, "...Excitation..." should read -- ...Excitations... --.

Column 7,
Line 11, "R=ρ~1/t·w" should read -- R=ρ·1/t·w --.

Signed and Sealed this

Nineteenth Day of October, 2004

JON W. DUDAS
*Director of the United States Patent and Trademark Office*